United States Patent
Otawa

(10) Patent No.: US 9,697,123 B2
(45) Date of Patent: Jul. 4, 2017

(54) INFORMATION PROCESSING DEVICE, CONTROL METHOD OF INFORMATION PROCESSING DEVICE AND CONTROL PROGRAM OF INFORMATION PROCESSING DEVICE

(71) Applicant: FUJITSU LIMITED, Kawasaki-shi, Kanagawa (JP)

(72) Inventor: Tomohito Otawa, Chofu (JP)

(73) Assignee: Fujitsu Limited, Kawasaki (JP)

( * ) Notice: Subject to any disclaimer, the term of this patent is extended or adjusted under 35 U.S.C. 154(b) by 80 days.

(21) Appl. No.: 14/712,950

(22) Filed: May 15, 2015

(65) Prior Publication Data

US 2016/0019150 A1 Jan. 21, 2016

(30) Foreign Application Priority Data

Jul. 18, 2014 (JP) .................................. 2014-147499

(51) Int. Cl.
| | | |
|---|---|---|
| G06F 12/00 | (2006.01) | |
| G06F 13/00 | (2006.01) | |
| G06F 13/28 | (2006.01) | |
| G06F 12/0815 | (2016.01) | |
| G06F 9/54 | (2006.01) | |

(Continued)

(52) U.S. Cl.
CPC ............ G06F 12/0815 (2013.01); G06F 9/54 (2013.01); G06F 9/543 (2013.01); G06F 12/0804 (2013.01); G06F 12/0868 (2013.01); G06F 12/0873 (2013.01); G06F 2212/2542 (2013.01); G06F 2212/271 (2013.01); G06F 2212/283 (2013.01)

(58) Field of Classification Search
CPC ............. G06F 12/0815; G06F 12/0804; G06F 12/0868; G06F 12/0873; G06F 2212/2542
USPC .................................................. 711/141, 118
See application file for complete search history.

(56) References Cited

U.S. PATENT DOCUMENTS 6,163,806 A 12/2000 Viswanathan et al.
6,167,437 A 12/2000 Stevens et al.
(Continued)

FOREIGN PATENT DOCUMENTS

JP  07-182298  7/1995
JP  11-120116  4/1999
(Continued)

OTHER PUBLICATIONS

Extended European Search Report mailed Dec. 23, 2015 for corresponding European Patent Application No. 15167947.9, 7 pages.

Primary Examiner — Charles Rones
Assistant Examiner — Sidney Li
(74) Attorney, Agent, or Firm — Fujitsu Patent Center

(57) ABSTRACT

An information processing device comprising a plurality of nodes, each nodes comprising an arithmetic operation device configured to execute an arithmetic process, and a main memory which stores data, wherein each of arithmetic operation devices belonging to each of the plurality of nodes is configured to read a target data of which the arithmetic operation unit executes the arithmetic operation from a storage device except the main memory, based on a first address information indicating a storage position in the storage device, and write the target data into the main memory of own node.

9 Claims, 19 Drawing Sheets

(51) Int. Cl.
　　　*G06F 12/0804*　　(2016.01)
　　　*G06F 12/0868*　　(2016.01)
　　　*G06F 12/0873*　　(2016.01)

(56) References Cited

U.S. PATENT DOCUMENTS

| | | | |
|---|---|---|---|
| 6,389,513 | B1 | 5/2002 | Closson |
| 6,701,421 | B1 | 3/2004 | Elnozahy et al. |
| 2003/0009640 | A1 | 1/2003 | Arimilli et al. |
| 2009/0320036 | A1* | 12/2009 | Ries ................. G06F 9/5033 718/104 |
| 2012/0226850 | A1 | 9/2012 | Nakanishi |

FOREIGN PATENT DOCUMENTS

| | | |
|---|---|---|
| JP | 2002-140229 | 5/2002 |
| JP | 2003-067357 | 3/2003 |
| JP | 2006-011913 | 1/2006 |
| JP | 2011-238278 | 11/2011 |
| JP | 2012-185609 | 9/2012 |

* cited by examiner

FIG.15A

LSTr1
| Address of PGr1 |
| ......... |
| ......... |
| Address of PGrp1 |

Page list for read process of first user thread 101
Page list for read process of second user thread 102

FIG.15B

LSTr2
| Address of PGr2 |
| ......... |
| ......... |
| Address of PGrp2 |

Page list for read process of third user thread 103
Page list for read process of fourth user thread 104

FIG.15C

LSTr3
| Address of PGr3 |
| ......... |
| ......... |
| Address of PGrp3 |

Page list for read process of fifth user thread 105
Page list for read process of sixth user thread 106

FIG.15D

LSTr4
| Address of PGr4 |
| ......... |
| ......... |
| Address of PGrp4 |

Page list for read process of seventh user thread 107
Page list for read process of eighth user thread 108

FIG.19A

LSTw1

| Address of PGw1 |
| --- |
| ......... |
| ......... |
| Address of PGwp1 |

- Page list for write process of first user thread 101
- Page list for write process of second user thread 102

FIG.19B

LSTw2

| Address of PGw2 |
| --- |
| ......... |
| ......... |
| Address of PGwp2 |

- Page list for write process of third user thread 103
- Page list for write process of fourth user thread 104

FIG.19C

LSTw3

| Address of PGw3 |
| --- |
| ......... |
| ......... |
| Address of PGwp3 |

- Page list for write process of fifth user thread 105
- Page list for write process of sixth user thread 106

FIG.19D

LSTw4

| Address of PGw4 |
| --- |
| ......... |
| ......... |
| Address of PGwp4 |

- Page list for write process of seventh user thread 107
- Page list for write process of eighth user thread 108

INFORMATION PROCESSING DEVICE, CONTROL METHOD OF INFORMATION PROCESSING DEVICE AND CONTROL PROGRAM OF INFORMATION PROCESSING DEVICE

CROSS-REFERENCE TO RELATED APPLICATION

This application is based upon and claims the benefit of priority of the prior Japanese Patent Application No. 2014-147499, filed on Jul. 18, 2014, the entire contents of which are incorporated herein by reference.

FIELD

The embodiments discussed herein are related to an information processing device, a control method of the information processing device and a control program of the information processing device.

BACKGROUND

An information processing device (described as "an NUMA type information processing device" appropriately as follows) using a non-uniform memory access (called as NUMA: Non-Uniform Memory Access) architecture is proposed. The NUMA type information processing device has a plurality of nodes including a processor (also called as CPU (Central Processing Unit) core) as an arithmetic processing device and a memory as a main memory, and has a constitution to connect between the nodes through an interconnect.

In the NUMA type information processing device, each node is connected to a storage device through the interconnection, for example. The NUMA type information processing device performs data transmission between the node and between the memory in the node and the storage device.

CITATION

Patent Document

[Patent document 1] Japanese Laid-open Patent publication No. 2011-238278.
[Patent document 2] Japanese Laid-Open Patent Publication No. Hei 11-120116.
[Patent document 3] Japanese Laid-open Patent publication No. 2006-011913.
[Patent document 4] Japanese Laid-open Patent publication No. 2003-067357.
[Patent document 5] Japanese Laid-Open Patent Publication No. Hei 07-182298.
[Patent document 6] Japanese Laid-open Patent publication No. 2002-140229.

SUMMARY

In the NUMA type information processing device, it is desirable to perform the transfer of data in conjunction with the arithmetic operation effectively, in order to effectively use a hardware resource and to speed up the processing speed.

An information processing device having a plurality of nodes, each nodes including an arithmetic operation device configured to execute an arithmetic process, and a main memory which stores data, wherein each of arithmetic operation devices belonging to each of the plurality of nodes is configured to read a target data of which the arithmetic operation unit executes the arithmetic operation from a storage device except the main memory, based on a first address information indicating a storage position in the storage device, and write the target data into the main memory of own node.

Effect of the Invention

According to the one aspect, it is possible to perform the data transmission in the information processing device effectively.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a diagram explaining the identification of the NUMA node that a domain defined by an address of the physical memory belongs to.

FIG. 15A-FIG. 15D are diagrams explaining a page list for the read processing.

FIG. 19A-FIG. 19D are diagrams explaining a page list for the write processing.

DESCRIPTION OF EMBODIMENTS (Non-Uniform Memory Access)

Figure 1:
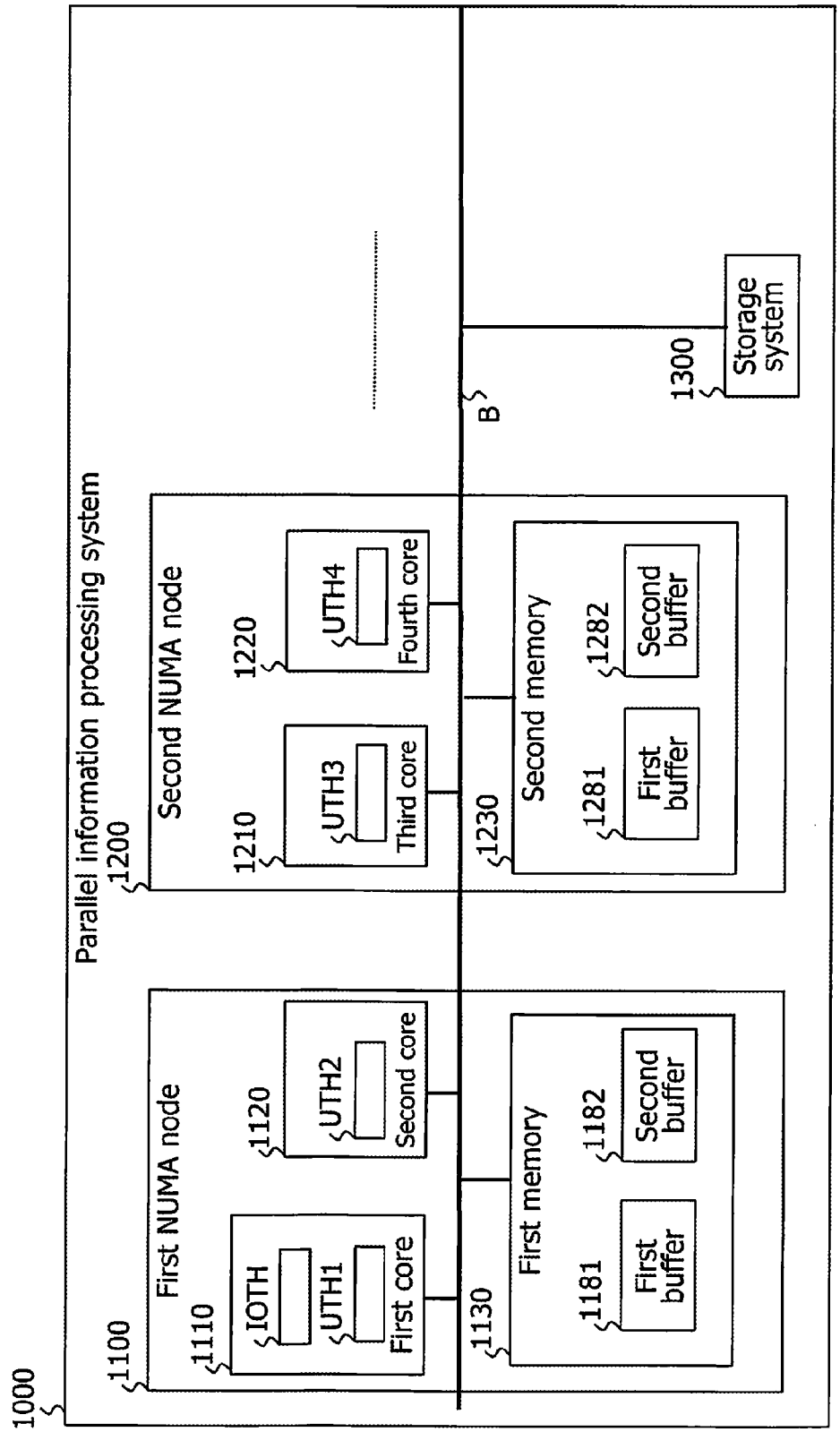
FIG. 1 is a diagram explaining a technique in conjunction with the embodiment.

FIG. 1 is a diagram explaining a technique in conjunction with the embodiment. In addition, in the explanation of the following drawings, same elements are marked by same signs and an explanation which is done once is omitted.

In FIG. 1, a parallel information system 1000 carries out parallel information processing by non-uniform memory access (as described with "NUMA" appropriately as follows). The parallel information system 1000 has a first NUMA node 1100, a second NUMA node 1200 and a storage system 1300. In addition, the number of NUMA nodes is an example.

(NUMA Node)

The first NUMA node 1100 and the second NUMA node 1200 have a plurality of CPU cores (described as "core" as follows appropriately) and one memory each. The memory is constituted by a physical memory, and, for example, DRAM (Dynamic Random Access Memory).

The first NUMA node 1100 has a first core 1110 and a second core 1120 and a first memory 1130. The second NUMA node 1200 has a third core 1210 and a fourth core 1220 and a second memory 1230.

The first core 1110 and the second core 1120 and first memory 1130 and the third core 1210 and the fourth core 1220 and the second memory 1230 and the storage system 1300 are connected to a bus B.

(CPU Core)

The first core 1110 executes user thread UTH1 of the user application. For example, the user application is an application which carries out parallel information processing for an operation data and outputs an operation result.

In addition, the thread is a divided batch when a certain processing is divided into a plurality of processing and carried out at the same time. In other words, a thread is an execution unit of use of CPU, namely the execution unit of the program.

The first core 1110 carries out an I/O thread IOTH which carries out the transfer of data (also called as the input and output processing) more. For example, the I/O thread IOTH is carried out by a kernel of the operating system (OS: Operating System). The I/O thread IOTH is called by the user thread and performs the input and output processing of data.

The second core 1120 executes user thread UTH2 of the user application. The third core 1210 executes user thread UTH3 of the user application. The fourth core 1220 executes user thread UTH4 of the user application.

Each of the user threads UTH1-UTH4 carry out the parallel information processing assigned to each thread for the operation data and output an operation result.

(NUMA Optimization)

In the NUMA type information processing device, an access time when the core of a certain node accesses the memory (also called as a remote memory) of the different node becomes longer than the access time when the core of this node accesses the memory (also called as the local memory) of the own node.

Therefore, the parallel information system 1000 executes memory allocation controls which allocate the data, of which the core accesses, in the memory (local memory) located near this core as much as possible. Such memory allocation control is described with "NUMA optimization" appropriately.

In the "NUMA optimization" technique based on program operation in the memory space (described appropriately with user space) where the application except the operating system operates, processing of the user application is assigned to the user thread which each core carries out, so that the processing load of every core becomes uniform. And in such a technique, the data which the user thread accesses frequently are allocated in the memory where is located nearest to the core which carries out this user thread. In other words, in such a technique, data allocation to the memory is decided depending on data access pattern of the user application.

(Example of Data Reading and Writing Processing)

The parallel information processing includes the processing to read the data from the storage system 1300 and the processing to read the data from the memory (for example, the first memory 1130) and write the data into the storage system 1300.

In these data reading processing and data writing processing, the memory area that the data is transferred directly between the storage system 1300 and the memory is a buffer domain secured in the memory area (described as kernel space as follows) in the operating system. And the data transmission between the user space and the storage system 1300 are carried out indirectly through this buffer domain. In other words, the data are copied using the core between the buffer domain and the user space of the kernel space by the operating system. In addition, this copy processing is carried out by extension of the system call of which the user application publishes for the operating system.

(Reading of Operation Data)

Before the user threads UTH1-UTH4 carries out the above parallel information processing, the I/O thread, for example, reads the operation data from the storage system 1300 and stores it in the memory.

In this storage operation, the I/O thread IOTH memorizes the read operation data in the second buffer 1182 of the first memory 1130 which is a local memory. Then, the I/O thread IOTH copies the operation data which is memorized in the second buffer 1182 in the first buffer 1181. Here, the second buffer 1182 is a buffer domain of the kernel space. And the first buffer 1181 is a buffer domain of so-called user space.

(Parallel Information Processing)

Here, the user threads UTH1, UTH2 perform the access (called as local access) to the first buffer 1181 of the first memory 1130 and perform the parallel information processing for the operation data of the user threads UTH1, UTH2. And the user threads UTH1, UTH2 write the result data indicating the result of the parallel information processing in the first buffer 1181.

In addition, the user threads UTH3, UTH4 perform the access (called as remote access) to the first buffer 1181 of the first memory 1130 and read the operation data for the user threads UTH3, UTH4 and write it in the first buffer 1281 of the second memory 1230. And the user threads UTH3, UTH4 perform parallel information processing for the operation data for the user threads UTH3, UTH4. And the user threads UTH3, UTH4 write the result data indicating the result of the parallel information processing in the first buffer 1281.

The I/O thread IOTH maintains a wait state until the writing of the result data in which the user threads UTH3, UTH4 carry out is completed.

The user threads UTH3, UTH4 perform the remote access to the first memory 1130 as described and read the operation data of the user threads UTH3, UTH4 and write it in the first buffer 1281 of the second memory 1230. Therefore, as described above, this remote access takes a time in comparison with the local access.

Therefore the starting point of the arithmetic process by the user threads UTH3, UTH4 are delayed than the starting point of arithmetic process by the user threads UTH1, UTH2. As a result, the user threads UTH3, UTH4 finish the writing of the result data for first buffer 1281 with a delay from a point in which the user threads UTH1, UTH2 finish to write the result data in the first buffer 1181. By this delay (called the unevenness of the end timing), time of the above wait state of the I/O thread IOTH becomes longer.

(Write of Operation Result Data)

When this wait state is finished, the I/O thread IOTH copies the operation result data written in the first buffer 1181 of the first memory 1130 into the second buffer 1182. And the I/O thread IOTH writes the operation result data which is copied into the storage system 1300.

When this writing is finished, the I/O thread IOTH copies the operation result data written in the first buffer 1281 in the second memory 1230 into the second buffer 1282. And the I/O thread IOTH writes the operation result data which is copied into the storage system 1300.

In addition, when the I/O thread IOTH receives the write instruction from the user thread the I/O thread IOTH is carried out with a CPU core in which the user thread operates and performs the above writing process. In addition, the second buffer 1282 is a buffer domain of the kernel space. And the first buffer 1281 is a buffer domain of so-called user space.

(NUMA Optimization in the Data Transmission)

As described above, when the wait state of the I/O thread becomes longer by the remote access, not only the processing time becomes long, but also a resource such as a core and a memory are uselessly wasted.

Here, by performing the "NUMA optimization" in the data transmission, efficiency of the data transmission between the memory in the node and storage system 1300 greatly vary. Because a main operation of the data transmission is the I/O thread IOTH on the operating system side, it is difficult to apply the "NUMA optimization" to this data transmission. This difficult reason will be described.

In the data transmission, the I/O thread IOTH receives the demand of the memory access by the user application (user thread) and, based on this demand, accesses the memory. In other words, the I/O thread IOTH works to; so to speak, take over the memory access of the user thread. Therefore, the I/O thread IOTH does not have information needed for the "NUMA optimization" such as the data access patterns of this user thread.

This data access pattern is a pattern to indicate to the operation data stored in a storage device in which a certain user thread carries out the arithmetic process processing.

In this way, it is difficult to apply the "NUMA optimization" to this data transmission, because the I/O thread IOTH does not have information needed for the "NUMA optimization".

(Efficiency Progress of Data Transmission)

By the way, in the example in FIG. 1, because one core carries out the data transmission between the memory in the node and the storage system 1300, the processing load for this core increases, and the processing capacity of this core may decrease. As a result, efficiency of this data transmission decreases. Therefore, when the transfer processing is distributed by parallel computation of this data transmission processing by each core, the load of the transmission process that a core carries out is distributed. As a result, efficiency of this data transmission advances.

In this distribution of the data transmission, in order to suppress the unevenness of the end timing, it is desirable that the parallel information processing device carries out the following processing. The processing is a processing that each of the cores reads data to access from the storage device based on the above data access pattern and writes it in the local memory. Below, the parallel information processing device which performs the data transmission between the memory in the node and the storage device effectively will be described.

[System Constitution of Information System]

Figure 2:
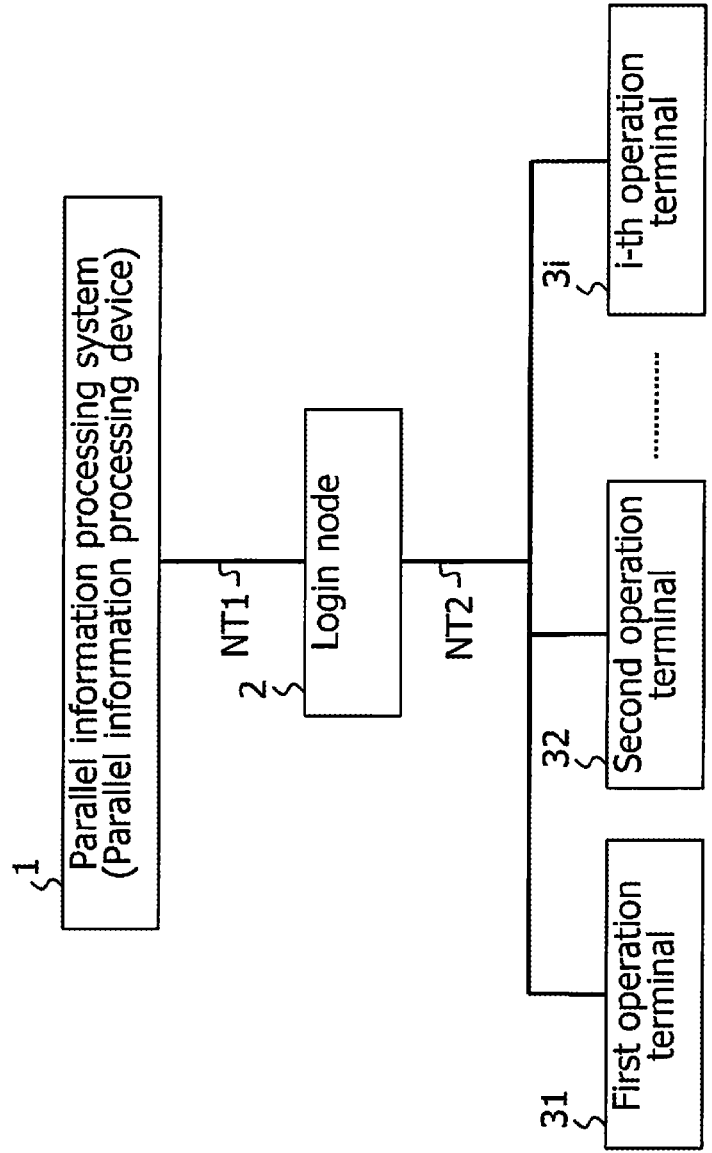
FIG. 2 is a diagram indicating system constitution of information system SYS according to the embodiment.

FIG. 2 is a diagram indicating system constitution of information system SYS according to the embodiment. The information system SYS has the parallel information system (parallel information processing device) 1, a login node 2 and a first operation terminal device 31—i-th (i of the small letter is the integer and is more than 3) operation terminal device 3i. Below, the parallel information processing device 1 is described with parallel information system 1.

The parallel information system 1 connects to the login node 2 through network NT1 and the login node 2 connects to the first terminal device 31—i-th terminal device 3i through network NT2. The networks NT1, NT2 are LAN (Local Area Network), for example.

The parallel information system 1 executes a program fast by performing information processing using a plurality of cores (called as the processor core) in parallel. For example, the parallel information system 1 is an information processing device using the NUMA architecture.

The login node 2 carries out the login processing of the user and program development and job operation for the parallel information system 1. For example, the login node 2 has a job cueing system, and instructs the execution of the job to the parallel information system 1 to let the parallel information system 1 carry out the job. The parallel information system 1, in response to the execution instruction of the job, produces a main thread in one of the plurality of cores in the NUMA node described in FIG. 3, and lets this one core carry out this main thread. Then the main thread produces a sub-thread in each of other cores, and lets each of other cores carry out the sub-thread.

In addition, the login node 2 carries out management, scheduling, and the monitoring of the job carried out in the parallel information system 1.

The first terminal device 31—i-th terminal device 3i order the execution of the job to the parallel information system 1 through the login node 2. The login node 2, in response to these instructions, performs cueing of the job and orders the execution of the job which is cued to the parallel information system 1.

Furthermore, the first terminal device 31—i-th terminal device 3i receives a result of job (operation result) that the parallel information system 1 output by the execution of this job and, for example, outputs the operation result to a display unit (not illustrated in FIG. 2).

[Hardware Constitution]

Figure 3:
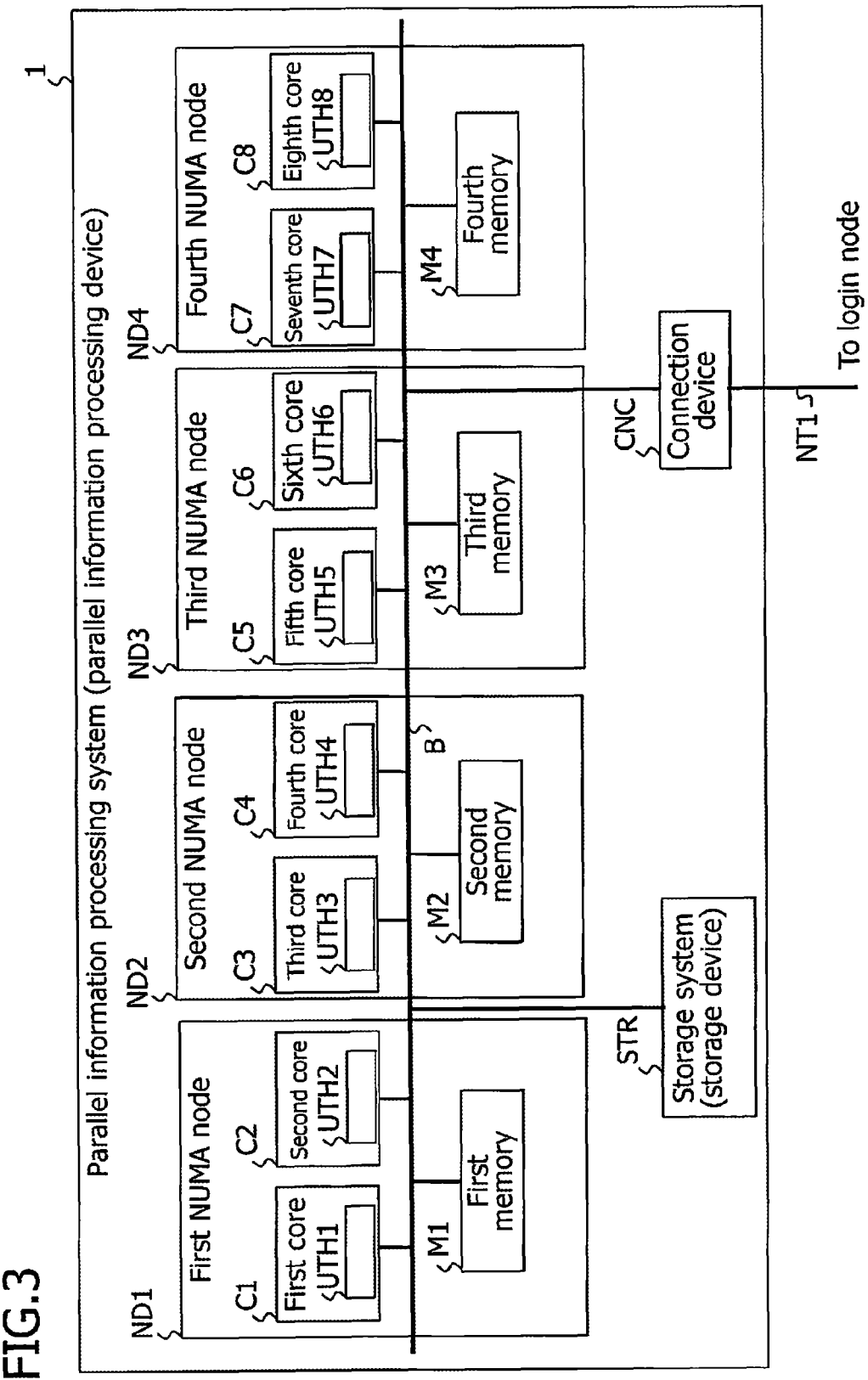
FIG. 3 is a diagram of hardware constitution of parallel information system 1 in FIG. 2.

FIG. 3 is a diagram of hardware constitution of parallel information system 1 in FIG. 2. The parallel information system 1 has a first NUMA node ND1—a fourth NUMA node ND4 and a storage system (storage device) STR and a connection device CNC. Below, the storage device STR is described with storage system STR.

The parallel information system 1 is an example of the information processing device (called as the computer) having a plurality of nodes which has a processor (called as the core) as an arithmetic processor and a memory as the main memory.

The j-th ("j" is integer of 1~4) NUMA node NDj has a plurality of cores and one or more memory each. For example, this memory is DRAM. In the example of FIG. 3, the j-th NUMA node NDj has two cores and j-th memory Mj.

For example, the first NUMA node ND1 has a first core C1 and a second core C2 and a first memory M1. The second NUMA node ND2 has a third core C3 and a fourth core C4 and a second memory M2. The third NUMA node ND3 has a fifth core C5 and a sixth core C6 and a third memory M3. The fourth NUMA node ND4 has a seventh core C7 and a eighth core C8 and a fourth memory M4.

The k-th (k is an integer of 1-8) core Ck carries out k-th thread group Tk each. For example, the first core C1 carries out the first thread group T1.

The parallel information system 1 is able to execute multi-processing by the constitution of the NUMA node described above. And the parallel information system 1 carries out the parallel information processing application (program) of the multi-thread model which executes the parallel information processing by a user thread (called as the operation thread) that each of eight cores carries out. In addition, multi-processing with the multi-thread model are called as a hybrid model.

The storage system STR has one or more mass storage device. For example, the mass storage device may include a hard disk drive and the solid state drive as the auxiliary storage. The storage system STR is an example of the main memory except the main memory in the node.

The connection device CNC functions as a connection interface for the login node 2 depicted by FIG. 2 and connects to the network NT1.

The first core C1~the eighth core C8, the first memory M1~the fourth memory M4, the storage system STR and the connection device CNC connect to the bus B each. In addition, the storage system STR may connect to the bus B by a PCI (Peripheral Component Interconnect) bus.

In addition, the number (four) of NUMA nodes, the number (two) of cores in which each NUMA node has, the number (one) of the memory are exemplified and may be other numbers.

[Software Constitution]

Figure 4:
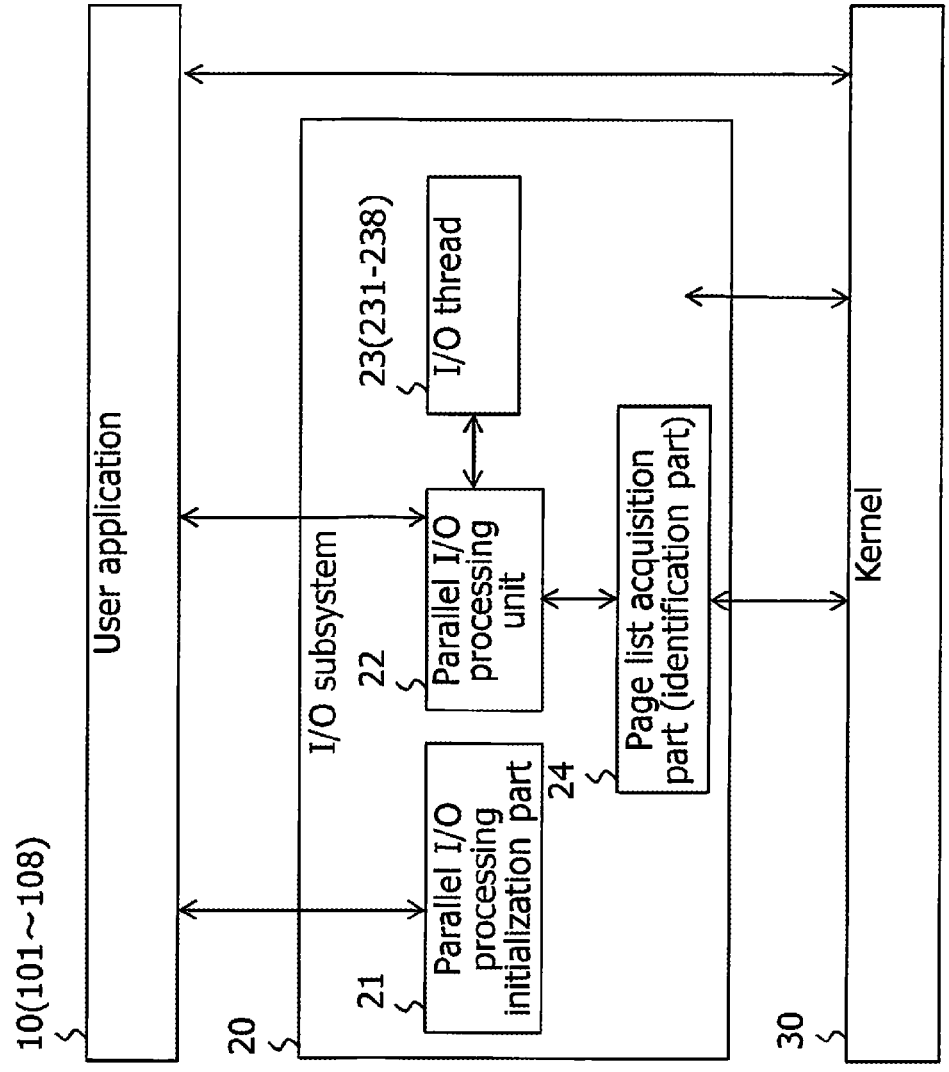
FIG. 4 is a diagram of software constitution of parallel information system 1 in FIG. 2.

FIG. 4 is a diagram of software constitution of parallel information system 1 in FIG. 2. The user application 10 is an application which carries out the parallel information processing for the operation data which is data for the operation target, and outputs an operation result, which is explained in FIG. 1.

Figure 5:
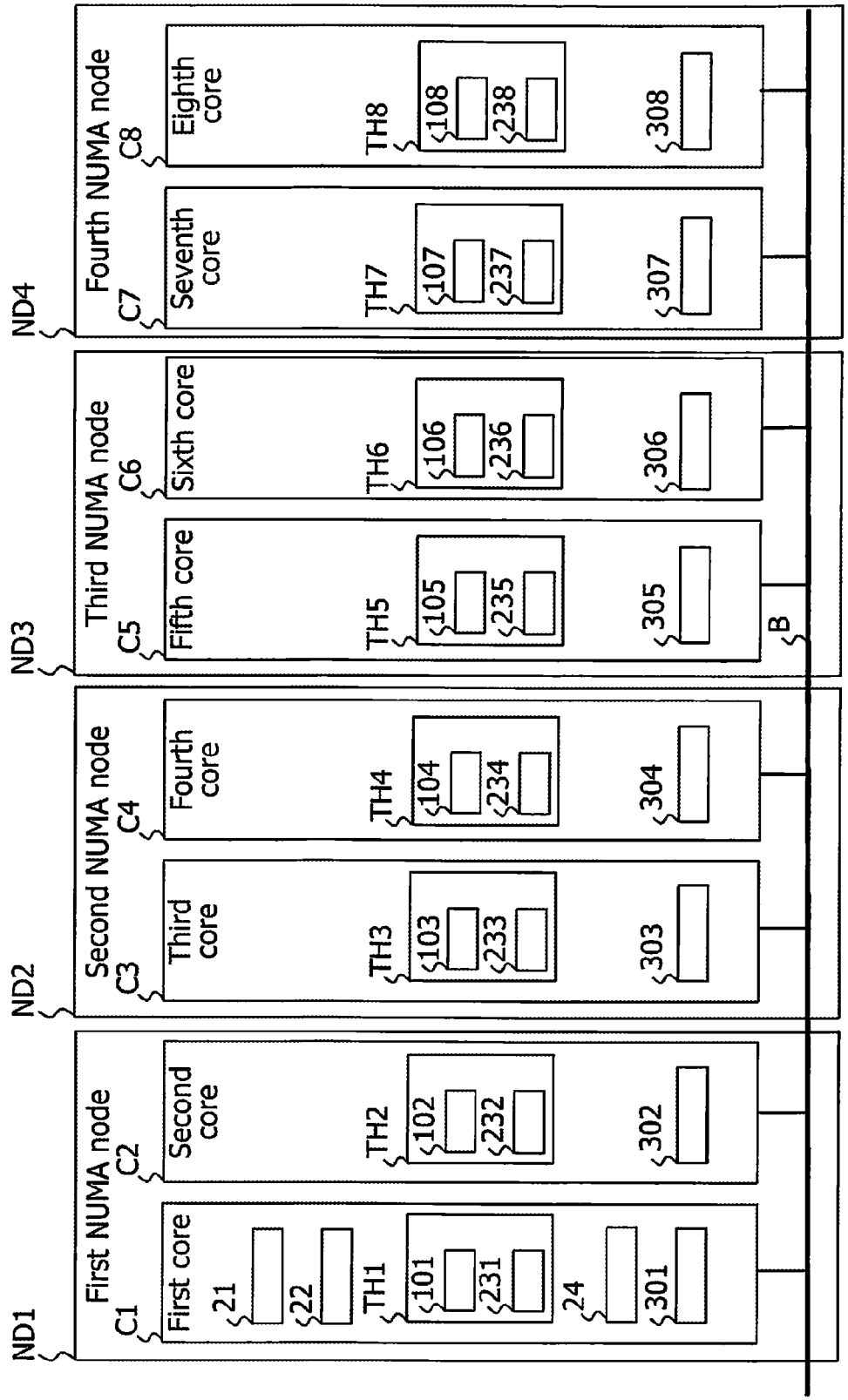
FIG. 5 is a diagram indicating a state in which the core depicted by FIG. 3 carries out the software explained in FIG. 4.

The user application 10 includes the first user thread (operation processing unit) 101~the eighth user thread (operation processing unit) 108 depicted by FIG. 5. Below, a user thread (operation processing unit) is described with a user thread.

The first user thread 101~the eighth user thread 108 carry out the parallel information processing assigned to each thread for the operation data, and output an operation result. In addition, this arithmetic process includes a various arithmetic process and is called as the information processing. The first user thread 101~the eighth user thread 108 is an example of the operation processing section to carry out the arithmetic process processing.

The I/O subsystem 20 carries out processing (described read processing appropriately as follows) to read the operation data from the storage system STR and to write it into the first memory M1—fourth memory M4.

The first user thread 101—the eighth user thread 108 carries out the above parallel information processing for the operation data written in the memory in the node that a core, which carry out the own thread, belongs to. And the first user thread 101—the eighth user thread 108 writes the data indicating the operation result (described with operation result data appropriately as follows) in the memory in the node (memory of the own thread) that the core, which carry out the own thread, belongs to. In addition, an I/O thread and a user thread which are carried out in the same core are called as the I/O thread and the user thread of the pair.

The I/O subsystem 20 carries out processing (described with write processing appropriately as follows) to write the operation result data, which are written in the first memory M1—the fourth memory M4, into the storage system STR.

The I/O subsystem 20 has a parallel I/O processing initialization unit 21, a parallel I/O processing unit 22, a I/O thread 23 and page list acquisition unit (specific part) 24. The page list acquisition unit (specific part) 24 is described as follows with page list acquisition unit 24.

The parallel I/O processing initialization unit 21 creates the I/O thread 23. The parallel I/O processing unit 22 instructs the execution of read processing and the write processing to the I/O thread 23.

The I/O thread 23 includes the first I/O thread (transfer part) 231—the eighth I/O thread (transfer part) 238 depicted by FIG. 5 and carries out the read processing and the write processing. Below, the I/O thread (transfer part) is described with an I/O thread as follows. The first I/O thread 231—the eighth I/O thread 238 is an example of the transfer part to transfer data in conjunction with arithmetic process.

The page list acquisition part 24 acquires a list which stores the address of the storage location (called as the storage area) in the memory. An address of this storage location is an address indicating the storage location in the j-th memory Mj, where the first I/O thread 231—the eighth I/O thread 238 write the operation data. In addition, an address of the domains in this memory is an address indicating the storage locations where the operation result data are written in the j-th memory Mj.

The kernel 30 is software carrying out a basic function of the operating system. This basic function is, for example, the management of hardware resources such as the storage system STR and the first memory M1—the fourth memory M4, an interrupt processing, a communication between the threads.

[Execution of the Software]

FIG. 5 is a diagram indicating a state in which the core depicted by FIG. 3 carries out the software explained in FIG. 4.

The k-th (k=an integer of 1-8) core Ck carries out the k-th thread group THk and the k-th kernel 30k. The k-th thread group is a thread group including one or two of the k-th user thread 10k and the k-th I/O thread 23k. In FIG. 5, it indicates that the k-th thread group THk includes the k-th user thread 10k and the k-th I/O thread 23k.

For example, the first core C1 carries out the first user thread 101, the first I/O thread 231, and the first kernel 301.

The k-th (k is an integer of 1~8) core Ck is an example of the processor which carries out the k-th user thread 10k and the k-th I/O thread 10k.

The kernel 30 depicted by FIG. 4 works in either core more than 1 of the first core C1—the eighth core C8. For example, the k-th user thread 10k instructs execution of the processing, in which the kernel 30 provides, using system call to the kernel 30. Then, the kernel 30 works in the k-th core Ck in which the k-th user thread 10k works and executes the process received the execution instruction. In this way, the state that the kernel 30 works in the k-th core is indicated schematically in mark 30k (301-308) in FIG. 4.

Furthermore, the first core C1 carries out the parallel I/O processing initialization part 21 and the parallel I/O processing par 22 and the page list acquisition part 24.

[Storage System and Memory]

Figure 6:
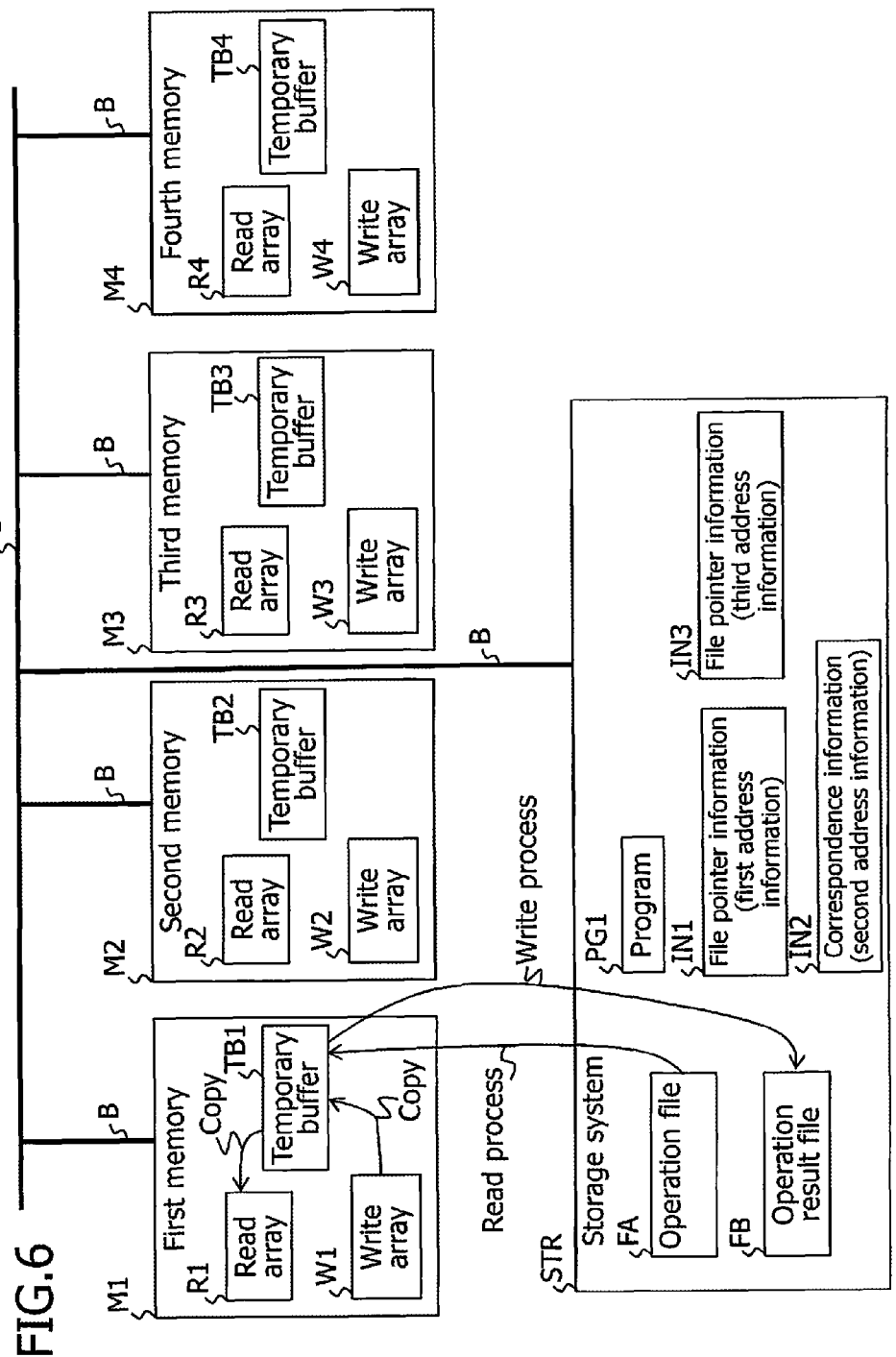
FIG. 6 is a diagram explaining the storage system and the memory depicted in FIG. 3.
Figure 7B:
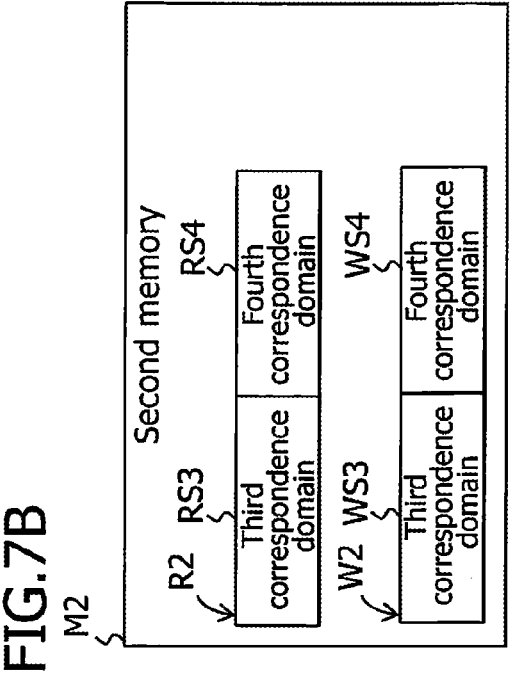
FIG. 7A-FIG. 7D are diagrams explaining the read array and the write array depicted by FIG. 6.
Figure 7D:
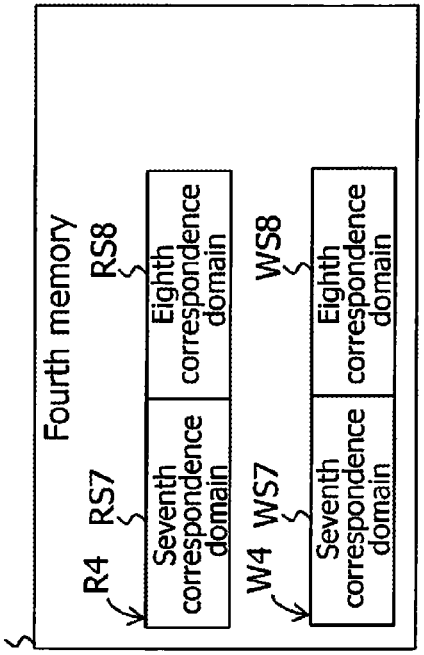
Figure 7A:
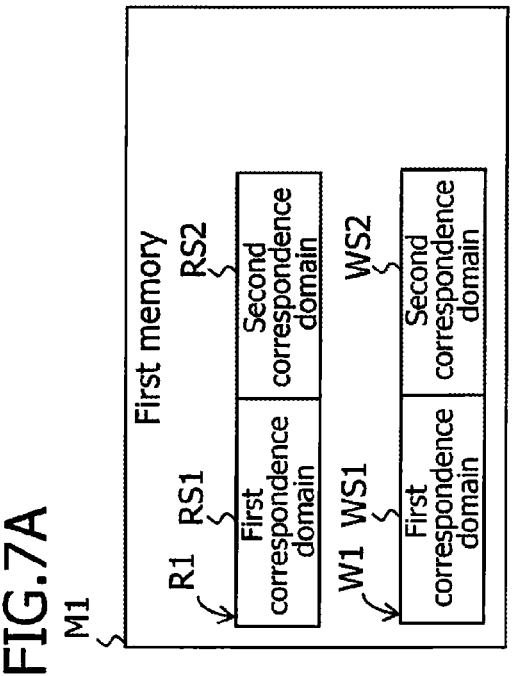
Figure 7C:
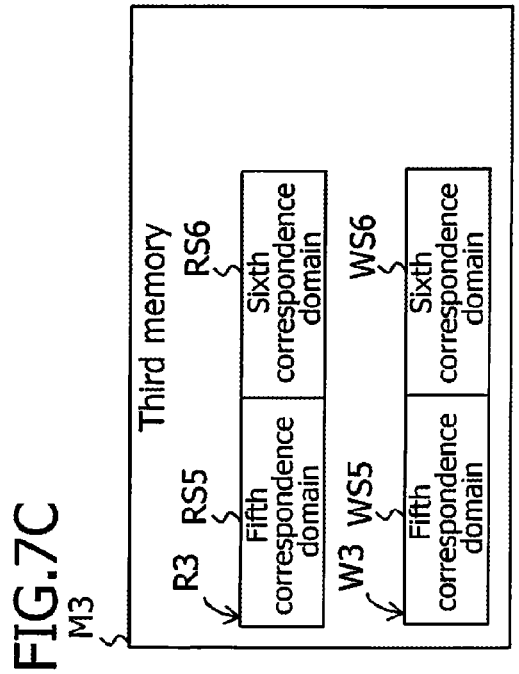

FIG. 6 is a diagram explaining the storage system and the memory depicted in FIG. 3. The storage system STR stores a file FA for the operation, an operation result file FB, and a program PG1. Furthermore, the storage system STR stores a file pointer information (a first address information) IN1 of the file FA for the operation, correspondence information (a second address information) IN2, and file pointer information (a third address information) IN3 of the operation result file FB. Below, the file pointer information (the first address information) IN1, the correspondence information (the second address information) IN2, the file pointer information (the third address information) IN3, are described each with a file pointer information IN1, a correspondence information IN2, a file pointer information IN3.

In addition, the file pointer information IN1 will be described in FIG. 8 and the correspondence information IN2 will be described in FIG. 12 and the file pointer information IN3 will be described in FIG. 9.

The file FA for the operation is a file in which data for the operation are stored. The operation result file FB is a file in which the operation result data are stored.

The program PG1 includes a user application 10, an I/O subsystem 20, an execute file of the kernel 30. For example, the first core C1 reads the program PG1 at the time of start of the parallel information system 1 from the storage system STR, and develops it in the first memory M1. The user application 10, the I/O subsystem 20, and the kernel 30 are carried out by development of this program PG1.

In addition, this execute file may be stored in the external storage medium (not illustrated in FIG. 6). This storage medium (also called as the recording medium) is a CD-ROM (Compact Disc Read Only Memory) and a DVD (Digital Versatile Disc), for example. In this case, the parallel information system 1 connects with a storage medium reading device (not illustrated in FIG. 6) which reads data memorized to external storage medium through a connection interface (not illustrated in FIG. 6).

The j-th (j is an integer of 1~4) memory Mj has read array Rj and write array Wj and a temporary buffer TB. For example, the first memory M1 has the read array R1 and the write array W1 and the temporary buffer TB1.

The read array Rj in the j-th memory Mj is an array to memorize a part of the operation data which is stored in the file FA for the operation. The write array Wj in the memory Mj is the array that the operation result data are written in. In addition, "read processing", "write processing", and "copy" in FIG. 6 will be described in FIG. 16 later.

FIG. 7A-FIG. 7D are diagrams explaining the read array and the write array depicted by FIG. 6. In addition, in FIG. 7A-FIG. 7D, illustration of a hardware constitution except the memory and the temporary buffer TB1-TB4 which are represented by FIG. 6 are omitted in order to simplify a diagram. The correspondence domain of the read array and the write array will be described in step S2 of FIG. 10 later.

[File for Operation]

Figure 8:
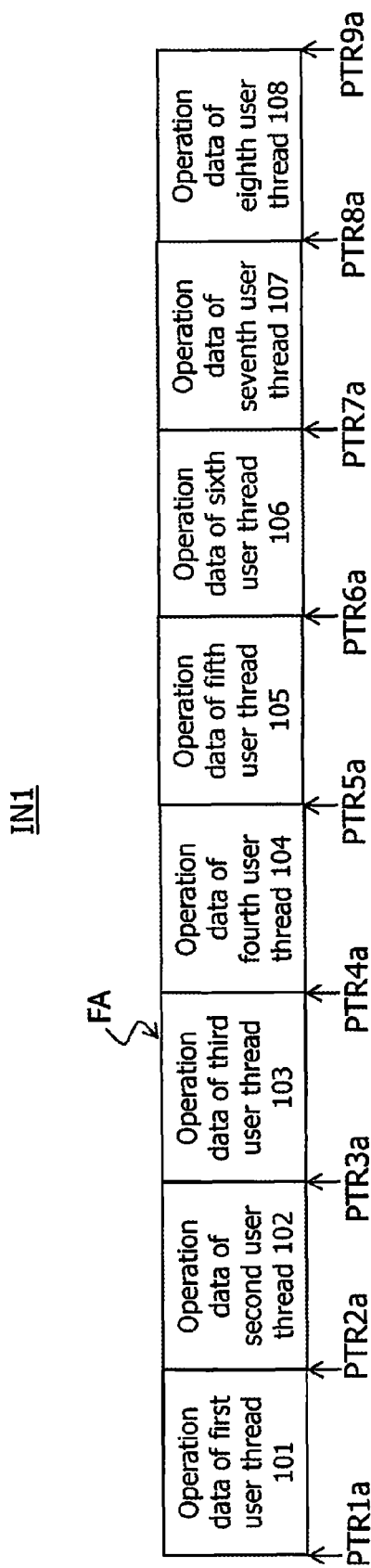
FIG. 8 is a diagram explaining the operation file FA.

FIG. 8 is a diagram explaining the operation file FA. The operation file FA is a file which stores the operation data (also called as the target data) which is an object of the arithmetic. The operation file FA stores the operation data of the k-th (k is an integer of 1~8) user thread 10k of integer) with a division. In addition, the operation file FA has various control information such as the header information, but illustration of this various control information is omitted.

The file pointer PTR1a—file pointer PTR9a indicate to an address (also called as the file pointer) of the operation file FA in the storage system STR.

The operation data of the k-th user thread 10k are stored in the domain designated by the file pointer PTR (k) a—PTR (k+1) a. Here, mark "(k)" indicates to an integer of "1"-"8"; "(k+1)" indicates to the integer which is added "1" to "k".

For example, the operation data of the first user thread 101 are stored in the domain defined by the file pointer PTR1a-PTR2a. The operation data of the second user thread 102 are stored in the domain defined by the file pointer PTR2a-PTR3a. The operation data of the third user thread 103 are stored in the domain defined by the file pointer PTR3a-PTR4a.

The operation data of the fourth user thread 104 are stored in the domain defined by the file pointer PTR4a-PTR5a. The operation data of the sixth user thread 106 are stored in the domain defined by the file pointer PTR6a-PTR7a. The operation data of the seventh user thread 107 are stored in the domain defined by the file pointer PTR7a-PTR8a. The operation data of the eighth user thread 108 are stored in the domain defined by the file pointer PTR8a-PTR9a.

The file pointer information IN1 depicted by FIG. 6 is file pointer PTR (k) a-PTR (k+1) a indicating the storage location of the operation data of the k-th user thread 10k in the storage system STR. In addition, the file pointer information IN1 is one example of the above first address information (referring to FIG. 6). The above first address information is information indicating the storage location of the operation data which is targeted by the arithmetic operation of the k-th user thread 10k in the storage system STR.

The developer (described as a developer appropriately as follows) of the user application 10 creates the operation file FA and the file pointer information IN1 and memorizes it in the storage system STR.

In addition, the developer may set the file pointer information IN1 to the user application 10 at the time of development of the user application 10 beforehand and may set it to the user application 10 at the time of a execution start of the user application 10.

In addition, the developer may store the file pointer information IN1 in the header domain of the operation file FA.

[Operation Result File]

Figure 9:
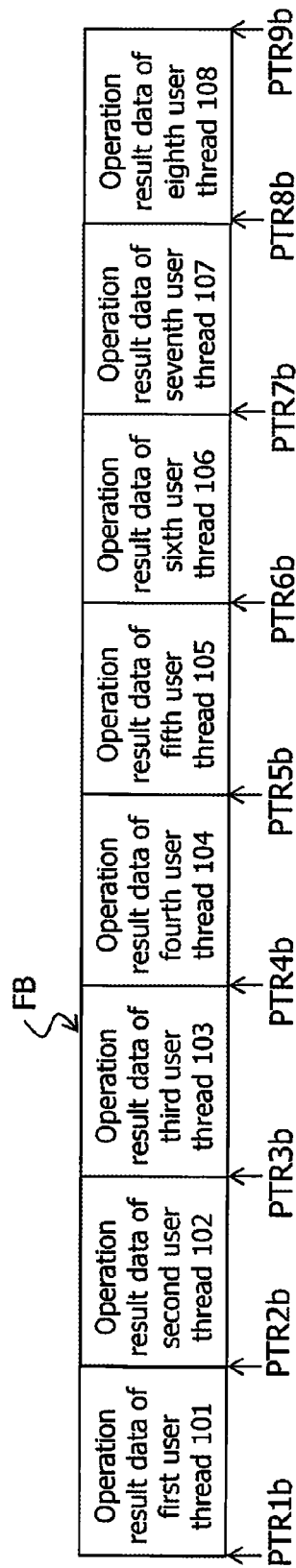
FIG. 9 is a diagram explaining the operation result file FB.

FIG. 9 is a diagram explaining the operation result file FB. The operation result file FB stores the operation result data of the k-th (k is an integer of 1~8) user thread 10k are stored with a division. In addition, the operation result file FB has various control information such as the header information, but illustration of this various control information is omitted.

The file pointer PTR1b-file pointer PTR9b indicate to an address of the operation result file FB in the storage system STR.

The operation result data of the k-th user thread 10k are stored in the domain defined by the file pointer PTR(k)b-PTR(k+1)b.

For example, the operation result data of the first user thread 101 are stored in the domain defined by the file pointer PTR1b-PTR2b.

The file pointer information IN3 depicted by FIG. 6 is the file pointer PTR (k) b-PTR (k+1) b indicating the storage location of operation result data of the k-th user thread 10k in the storage system STR. In addition, the file pointer information IN3 is an example of the above third address information (referring to FIG. 6). The above third address information is information indicating the storage location of the operation result data which indicates the results of the arithmetic of the k-th user thread 10$k$ in the storage system STR.

The developer stores the file pointer information IN3 in the storage system STR. In addition, the developer may set the file pointer information IN3 to the user application 10 at the time of development of the user application 10 beforehand and may set it to the user application 10 at the time of an execution start of the user application 10.

In addition, the developer may store the file pointer information IN3 in the header domain of the operation result file FB.

[Data Transmission Between Storage System and Memory]

Below the data transmission between the storage system and the memory according to the embodiment will be described. The k-th (k is an integer of 1~8) core Ck (arithmetic processor) belonging to each of a plurality of nodes has the k-th user thread 10$k$ and the k-th I/O thread 23$k$.

The k-th I/O thread (transfer part) 23$k$ reads the target data of which the k-th user thread 10$k$ carries out the arithmetic process based on the first address information (file pointer information IN1) indicating the storage location in the storage system STR from the storage system STR. And the k-th I/O thread 23$k$ writes the target data which is read into the memory (for example, the memory of the own node) of the node that the k-th core Ck belongs to.

Then, the k-th user thread 10$k$ in the k-th core Ck belonging to each of the plurality of nodes carries out the arithmetic process for the operation data written in the memory of the node that the k-th core Ck belongs to. For example, this arithmetic process is the parallel information processing.

And the k-th user thread 10$k$ in the k-th core Ck writes the operation result data indicating the operation result in the memory of the node that the k-th core Ck belongs to.

The k-th I/O thread 23$k$ in the k-th core Ck writes the operation result data written in the memory of the node that the k-th core Ck belongs to into the storage system STR. In this writing, the k-th I/O thread 23$k$ in the k-th core Ck begins to read the operation result data written in the memory of the node that the k-th core Ck belongs to. And the k-th I/O thread 23$k$ writes the operation result data which is read into the storage system STR based on the file pointer information IN3.

The data transmission according to the embodiment will be described with reference to FIG. 3-FIG. 9 in detail.

[Flow of Parallel Information Processing]

Figure 10:
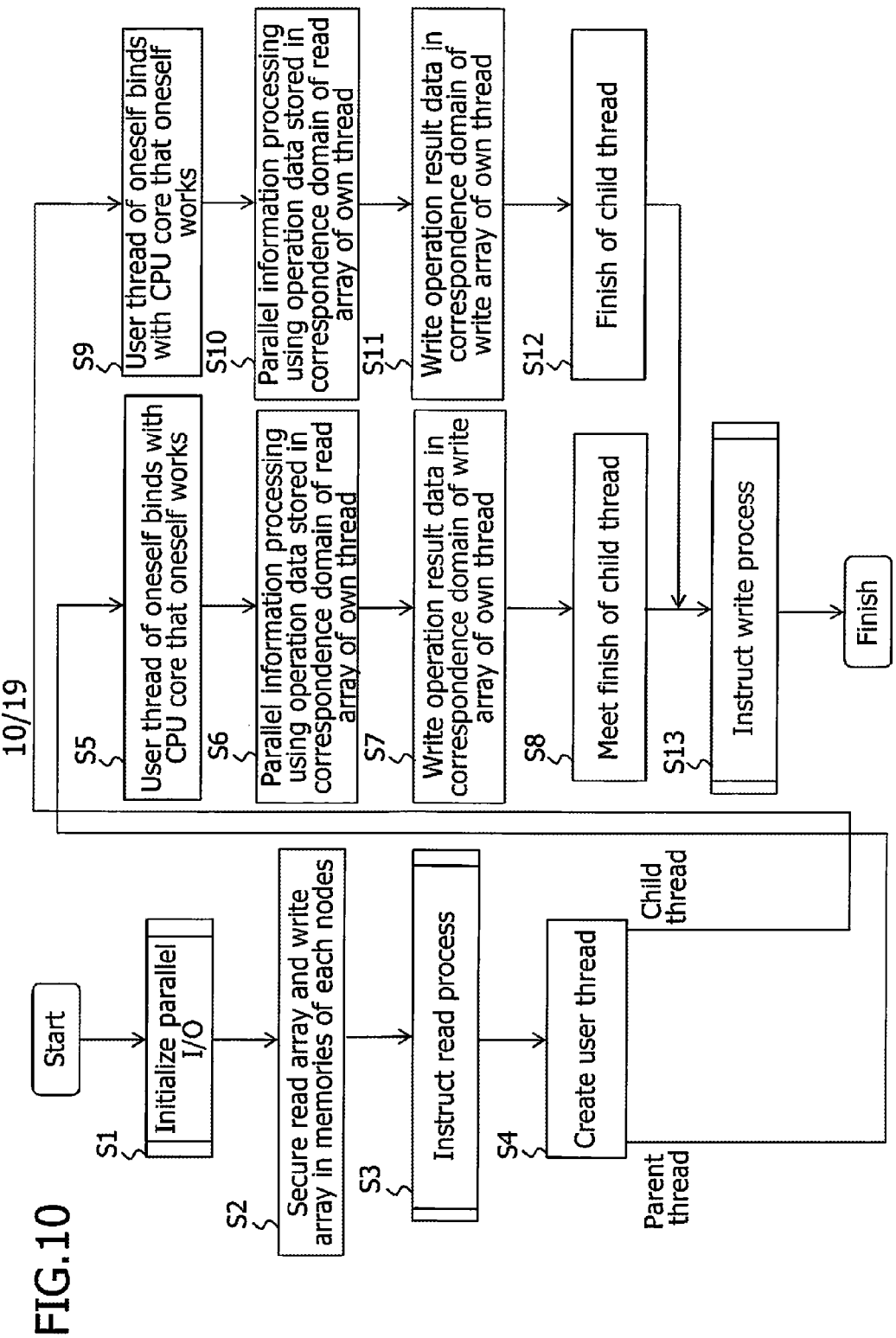
FIG. 10 is a flow diagram to explain a flow of the parallel information processing.

FIG. 10 is a flow diagram to explain a flow of the parallel information processing. In the explanation of FIG. 10, the kernel 30 of FIG. 4 works in the first core C1 of the first NUMA node ND1, for example. And the kernel 30 of the first core C1 reads a program (referring to the program PG1 of FIG. 6) for the parallel information processing, and develops it in the first memory M1. By the development, the first core C1 starts the execution of the parallel I/O processing initialization part 21, the parallel I/O processing part 22, the page list acquisition part 24, and the first user thread 101 as represented by FIG. 5.

In the state that the kernel 30 works, the login node 2 instructs the execution of the job for the parallel information processing to the parallel information system 1. Processing after step S1 is started afterward. In addition, in the explanation of the following flow diagram, a mark "Ss" (small letter "s" is an integer which is more than "1") means the step Ss and the letter called this step is omitted appropriately.

(Parallel I/O Initialization)

Step S1: the first user thread 101 instructs the parallel I/O initialization to the parallel I/O processing initialization part 21. The parallel I/O processing initialization part 21 creates the k-th I/O thread 23$k$ (k is an integer of 1-8) and let it the k-th core carry out, as depicted by FIG. 5 in response to the instruction. In addition, the parallel I/O initialization processing will be described in FIG. 11 in detail.

(Securing of Read Array and Write Array)

Step S2: the first user thread 101 secures a domain for the read array Rj and a domain for the write array Wj in the j-th memory (j is an integer of 1~4). For example, this security is carried out by reading of the system call for the kernel 30.

The securing in the step S2 will be described with reference to FIG. 7. For example, the first user thread 101 secures the read array R1 in the first memory M1. And the first user thread 101 secures a first correspondence domain RS1 corresponding to the first I/O thread 231 and a second correspondence domain RS2 corresponding to the second I/O thread 232 in the read array R1. And the first user thread 101 secures the write array W1 in the first memory M1. And the first user thread 101 secures the first correspondence domain WS1 corresponding to the first I/O thread 231 and the second correspondence domain WS2 corresponding to the second I/O thread 232 in the write array W1.

The first user thread 101 secures the read array R2 in the second memory M2. And the first user thread 101 secures a third correspondence domain RS3 corresponding to the third I/O thread 233 and a fourth correspondence domain RS4 corresponding to the fourth I/O thread 234 in the read array R2. And the first user thread 101 secures the write array W2 in the second memory M2. And the first user thread 101 secures the third correspondence domain WS3 corresponding to the third I/O thread 233 and the fourth correspondence domain WS4 corresponding to the fourth I/O thread 234 in the write array W2.

The first user thread 101 secures the read array R3 in the third memory M3. And the first user thread 101 secures a fifth correspondence domain RS5 corresponding to the fifth I/O thread 235 and a sixth correspondence domain RS6 corresponding to the sixth I/O thread 236 in the read array R3. And the first user thread 101 secures the write array W3 in the third memory M3. And the first user thread 101 secures the fifth correspondence domain WS5 corresponding to the fifth I/O thread 235 and the sixth correspondence domain WS6 corresponding to the sixth I/O thread 236 in the write array W3.

The first user thread 101 secures the read array R4 in the fourth memory M4. And the first user thread 101 secures a seventh correspondence domain RS7 corresponding to the seventh I/O thread 237 and the eighth correspondence domain RS8 corresponding to the eighth I/O thread 238 in the read array R4. And the first user thread 101 secures the write array W4 in the fourth memory M4. And the first user thread 101 secures the seventh correspondence domain WS7 corresponding to the seventh I/O thread 237 and the eighth correspondence domain WS8 corresponding to the eighth I/O thread 238 in the write array W4.

In addition, the first user thread 101 acquires a virtual address of the read array Rj and the write array Wj which are secured in the j-th (j is an integer of 1~4) memory Mj, from the kernel 30, for example.

The first user thread 101 may store a read identifier which identifies the correspondence domain in the read array Rj and a write identifier which identifies the correspondence domain in the write array Wj with a relationship with a thread identifier which will be explained by FIG. 11, in the first memory M1.

(Read Processing)

Step S3: the first user thread 101 requires the read processing for the parallel I/O processing section 22. The parallel I/O processing part 22 instructs the execution of the read processing to the first I/O thread 231—the eighth I/O thread 238 in response to a demand of the read processing.

The k-th (k is an integer of 1-8) I/O thread 23k reads the file pointer information IN1 in response to this read instruction from the storage system STR. And the k-th I/O thread 23k reads the operation data stored in the domain defined by the file pointer PTR(k)a-PTR(k+1)a in the operation file FA based on the file pointer information IN1. Then, the k-th I/O thread 23k writes the operation data which is read into the k-th correspondence domain RSk which is secured in response to the k-th user thread 10k in the read array of the own thread. In addition, the read array of the own thread is the read array which is secured in the memory in the node, of which a core carrying out the own thread belongs to.

For example, the first I/O thread 231, in response to this read instruction, reads the operation data of first user thread 101 of the pair from the operation file FA in the storage system STR and writes in the first correspondence domain RS1 in the read array R1 of the own thread.

The operation data of the first user thread 101 are operation data stored in the domain which is defined by the file pointers PTR1a-PTR2a in the operation file FA depicted by FIG. 8.

The second I/O thread 232, in response to this read instruction, reads the operation data of the second user thread 102 of the pair from the operation file FA in the storage system STR and writes it in the second correspondence domain RS2 of the read array R1 of the own thread.

The operation data of the second user thread 102 are operation data stored in the domain defined by the file pointer PTR2a-PTR3a in the operation file FA depicted by FIG. 8.

The third I/O thread 233—the eighth I/O thread 238 also carry out similar read and write process to the first I/O thread 231 and the second I/O thread 232. At the time of the step S3, the second user thread 102—the eighth user thread 108 are not created, but are created in next the step S4. In addition, the read processing will be described in FIG. 13 in detail.

(Creation of User Thread)

Step S4: the first user thread 101 creates a user thread. Specifically, the first user thread 101 creates the m-th user thread 10m where works with the m-th core Cm (m is an integer of 2-8). For example, the first user thread 101 creates the second user thread 102—the eighth user thread 108 which work each in the second core C2—the eighth core C8 as depicted by FIG. 5. The second user thread 102—the eighth user thread 108 are also called as a child thread.

(Process of Parent Thread)

Below, in the steps S5-S8, the processing that the first user thread 101, which is a parent thread (also called as a master thread), carries out will be described.

Step S5: the first user thread 101 binds oneself in the first core C1 where oneself works. By this bind, the first user thread 101 is restrained the execution in the core except the first core C1.

Step S6: the first user thread 101 carries out the parallel information processing assigned to an own thread using the operation data which is stored in the first correspondence domain RS1 of read array R1 (referring to FIG. 6, FIG. 7A~FIG. 7D) of the own thread.

Step S7: The first user thread 101, when the parallel information processing is finished, writes the data (operation result data) indicating the result of the parallel information processing into the first correspondence domain WS1 of the write array W1 (referring to FIG. 6, FIG. 7A~FIG. 7D) of the own thread.

Step S8: the first user thread 101 meets by the end of the data writing of all child threads (the second user thread—the eighth user thread). When the data writing of all child threads is finished, the process moves to the step S13.

(Child Thread)

Below, in the steps S9-S12, the processing that a child thread carries out will be described.

Step S9: The m-th (m is an integer of 2-8) user thread 10m binds oneself to the m-th core Cm where oneself works. By this bind, the m-th user thread 10m is restrained the execution in the core except the m-th core Cm. For example, the second user thread 102 binds to the second core C2 of which oneself works.

Step S10: the m-th user thread 10m carries out the parallel information processing assigned to an own thread using the operation data stored in the correspondence domain RSm of the read array (referring to FIG. 6, FIG. 7A~FIG. 7D) of the own thread. For example, the second user thread 102 carries out the parallel information processing using the operation data stored in the second correspondence domain RS2 of the read array R1 of the own thread. In addition, the third user thread 103 and the fourth user thread 104 respectively carry out the parallel information processing using the operation data stored each in the third and fourth correspondence domains RS3, RS4 of the read array R2 of the own thread. In addition, the fifth user thread 105 and the sixth user thread 106 carry out the parallel information processing using the operation data stored each in the fifth and the sixth correspondence domains RS5, RS6 of the read array R3 of the own thread. In addition, the seventh user thread 107 and the eighth user thread 108 carry out the parallel information processing using the operation data stored each in the seventh and the eighth correspondence domains RS7, RS8 of the read array R4 of the own thread.

Step S11: the m-th user thread 10m (m is an integer of 2-8), when the parallel information processing is finished, writes the data (operation result data) indicating the result of the parallel information processing into the m-th correspondence domain WSm of the write array of the own thread.

For example, the second user thread 102 writes the operation result data of the parallel information processing into the second correspondence domain WS2 of the write array W1 of the own thread when the parallel information processing is finished.

In addition, the third user thread 103 and the fourth user thread 104 write the operation result data of the parallel information processing into the third and fourth correspondence domains WS3, WS4 of the write array W2 of the own thread each when the parallel information processing is finished.

In addition, the fifth user thread 105 and the sixth user thread 106 write the operation result data of the parallel information processing into the fifth and the sixth correspondence domains WS5, WS6 of the write array W3 of the own thread each when the parallel information processing is finished.

In addition, the seventh user thread 107 and the eighth user thread 108 write the operation result data of the parallel information processing in the seventh and the eighth correspondence domains WS7, WS8 of the write array W4 of the own thread each when the parallel information processing is finished.

Step S12: When the writing of the operation result data is finished, the m-th (m is an integer of 2-8) user thread 10m notifies a finish to the first user thread 101.

(Write Processing)

Step S13: When the first user thread 101 receives a notice by the step S12, the first user thread 101 requires the write processing for the parallel I/O processing part 22. The parallel I/O processing part 22 instructs the execution of the write processing to the first I/O thread 231~the eighth I/O thread 238 in response to a demand of the write processing.

The k-th I/O thread 23k (k is an integer of 1-8) reads the file pointer information IN3 in response to the write instruction from the storage system STR. In addition, the k-th I/O thread 23k reads the operation result data stored in the correspondence domain WSk of the write array of the own thread. And the k-th I/O thread 23k writes the operation result data which is read into the correspondence domain of the operation result file FB in the storage system STR based on the file pointer information IN3. A correspondence domain of the operation result file FB is a domain defined by the file pointer PTR (k) b-PTR (k+1) b in the operation result file FB. In addition, the write processing will be described in FIG. 16 in detail.

As described in the step S1 of FIG. 10, the k-th core Ck (k is an integer of 1~8) carry out the k-th I/O thread 23k which execute the data transmission with the memory (local memory) belonging to own node and the storage system STR at the same time. In this way, transfer processing is distributed, because each core carries out the data transmission with memory belonging to an own node and the storage system STR. Processing load is reduced by this dispersion, and time to transfer end from a transfer start is shortened more. As a result, efficiency of the data transmission becomes high.

Furthermore, the k-th core Ck (k is an integer of 1-8) writes the operation data to perform the parallel information processing into the memory (local memory) belonging to an own node (step S3 of FIG. 10). And the k-th core Ck accesses the memory belonging to an own node and carries out the parallel information processing for this operation data (steps S6, S10 of FIG. 10). Therefore it is possible to control the latency of the memory access, because the k-th core Ck carries out the parallel information processing without accessing the memory (remote memory) in other nodes.

Furthermore, the k-th core Ck writes the operation result data obtained by execution of the parallel information processing into the memory belonging to an own node (steps S7, S11). And the k-th core Ck reads the operation result data written in the memory belonging to an own node, and writes the operation result data into the storage system STR (S13). In this way, the k-th core Ck does not read the operation result data from the memory (remote memory) in other nodes and does not write the operation result data which is read into the storage system STR. Therefore, it is possible to control above latency. It is possible to perform the data transmission between the memory in the node and the storage device effectively by controlling above latency.

[Parallel I/O Initialization]

Figure 11:
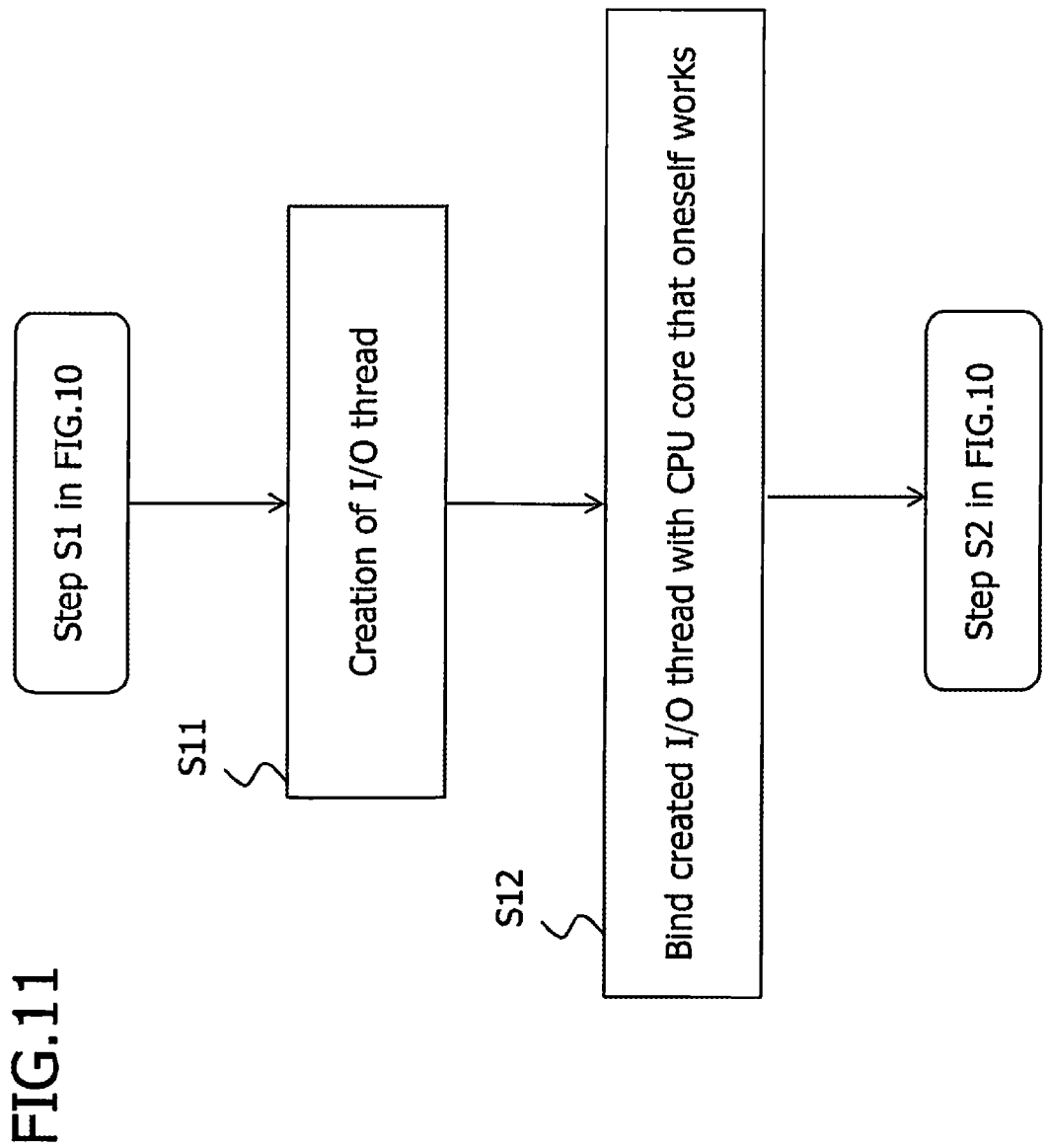
FIG. 11 is a flow diagram to explain the parallel I/O initialization process in the step S1 of FIG. 10.

FIG. 11 is a flow diagram to explain the parallel I/O initialization process in the step S1 of FIG. 10.

Step S11: the parallel I/O processing initialization part 21 creates the k-th I/O thread 23k (k is an integer of 1-8) and lets the k-th core Ck carry out, as described in FIG. 5, in response to the instruction of the parallel I/O initialization (referring step S1 in FIG. 10). In other words, the k-th core Ck carries out the k-th I/O thread 23k. Specifically, the first core C1—the eighth core C8 carry out the first I/O thread 231—the eighth I/O thread 238 at the same time each.

The parallel I/O processing initialization part 21 creates a thread identifier to distinguish the thread which is created in creating order of the k-th I/O thread 23k and stores it in the first memory M1 and manages.

Step S12: The created k-th I/O thread 23k (k is an integer of 1-8) binds oneself in the k-th core Ck where oneself works. For example, the first I/O thread 231 binds oneself in the first core C1 where oneself works. By the bind, the k-th I/O thread 23k is restrained the execution in the core except the k-th core Ck.

After the step S12, securing process of the read array and the write array in FIG. 10 is carried out (S2), and the read demand processing are performed (S3).

[Read Processing Demand]

Then, the read processing demand (step S3 of FIG. 10) will be described with reference to FIG. 12~FIG. 16.

(Address Correspondence)

Figure 12:
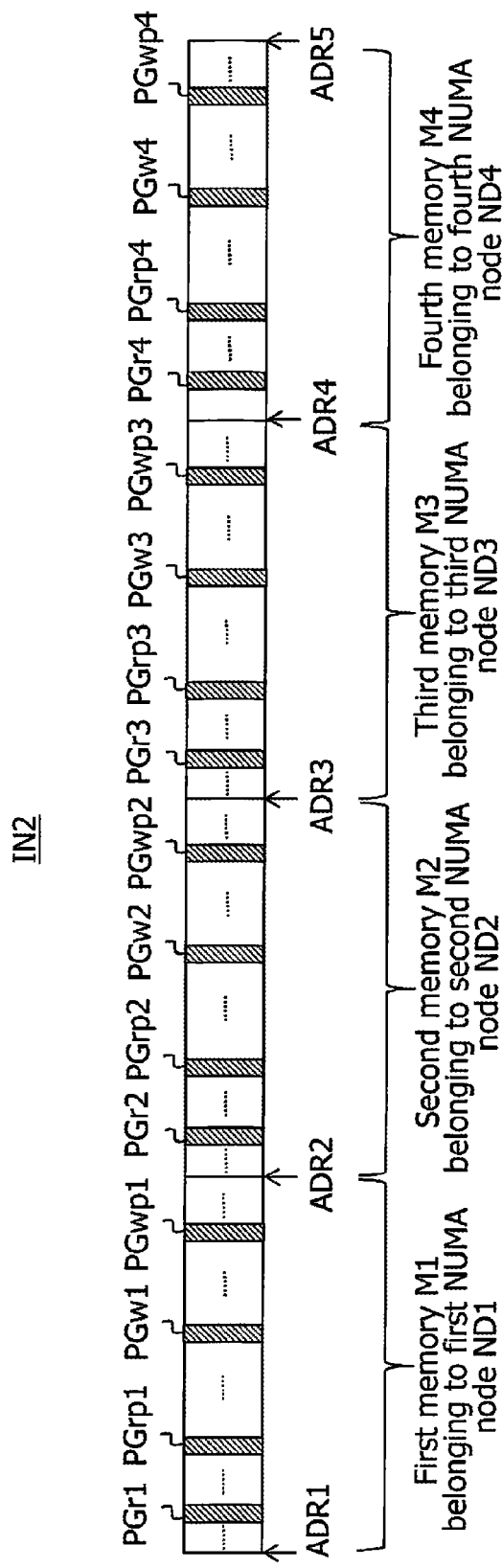

FIG. 12 is a diagram explaining the identification of the NUMA node that a domain defined by an address of the physical memory belongs to. FIG. 12 indicates to the correspondence information IN2. The correspondence information IN2 is an example of the second information indicating the domain of the memory belonging to each of a plurality of nodes. The kernel 30 administrates the correspondence information IN2. Below, an address of the physical memory is described with a physical address appropriately.

The correspondence information IN2 in FIG. 12 indicates that a domain (also called as memory space), which is defined by the physical address ADR (j)-ADR (j+1), corresponds to one area in the j-th memory Mj belonging to the j-th NUMA node NDj. In addition, a sign "(j)" indicates to an integer of "1"-"4"; and a sign "(j+1)" indicates the integer which is added "1" to "j".

For example, the correspondence information IN2 indicates that the domain defined by the physical address ADR1-ADR2 corresponds to one domain in the first memory M1 belonging to the first NUMA node ND1. In addition, the correspondence information IN2 indicates to the domain defined by the physical address ADR2-ADR3 corresponds to one domain in the second memory M2 to belong to the second NUMA node ND2.

In addition, the correspondence information IN2 indicates that the domain defined by the physical address ADR3-ADR4 corresponds to one domain in the third memory M3 to belong to the third NUMA node ND3. In addition, the correspondence information IN2 indicates that the domain defined by the physical address ADR4-ADR5 corresponds to one domain in the fourth memory M4 belonging to the fourth NUMA node ND4.

In addition, the rectangle represented by the hatching of the diagonal line schematically indicates an administration unit (also called as page) when the kernel 30 administrates the memory. For example, the number of bytes of the administration unit is 4 kilobytes. The administration unit will be described below.

The k-th I/O thread 23k in the k-th core Ck (k is an integer of 1~8) belonging to each of the plurality of nodes writes the object data which is read from the storage system STR in the memory of the node that the k-th core Ck belongs to based on the correspondence information IN2. These target data are an example of operation data for the target of arithmetic process. In addition, this writing will be described in FIG. 16.

[Read Processing]

Figure 13:
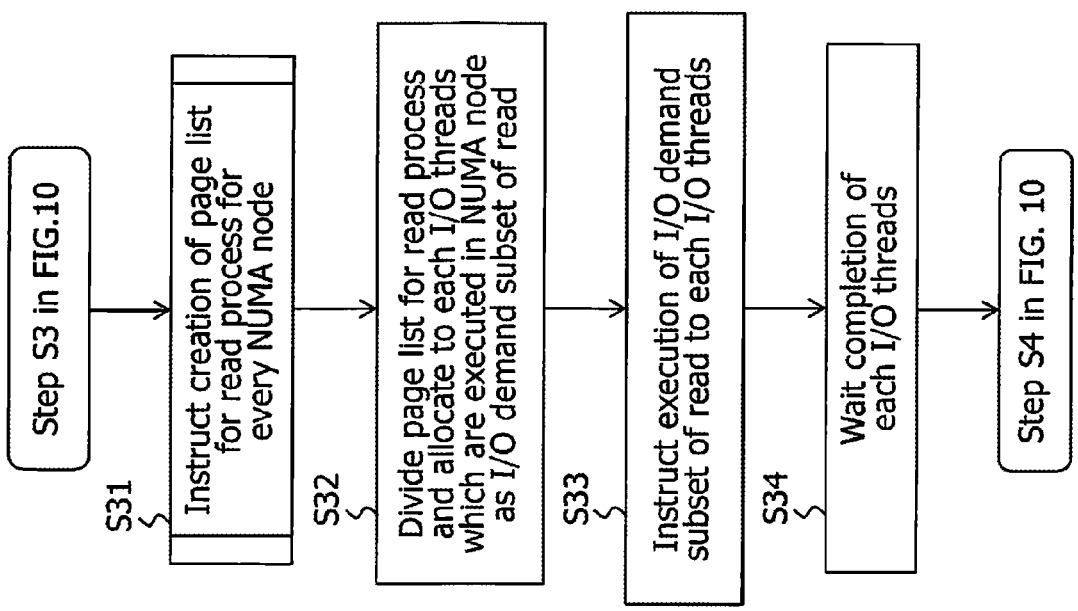
FIG. 13 is a diagram to explain an outline of the read demand process in the step S3 in FIG. 10.
Figure 14:
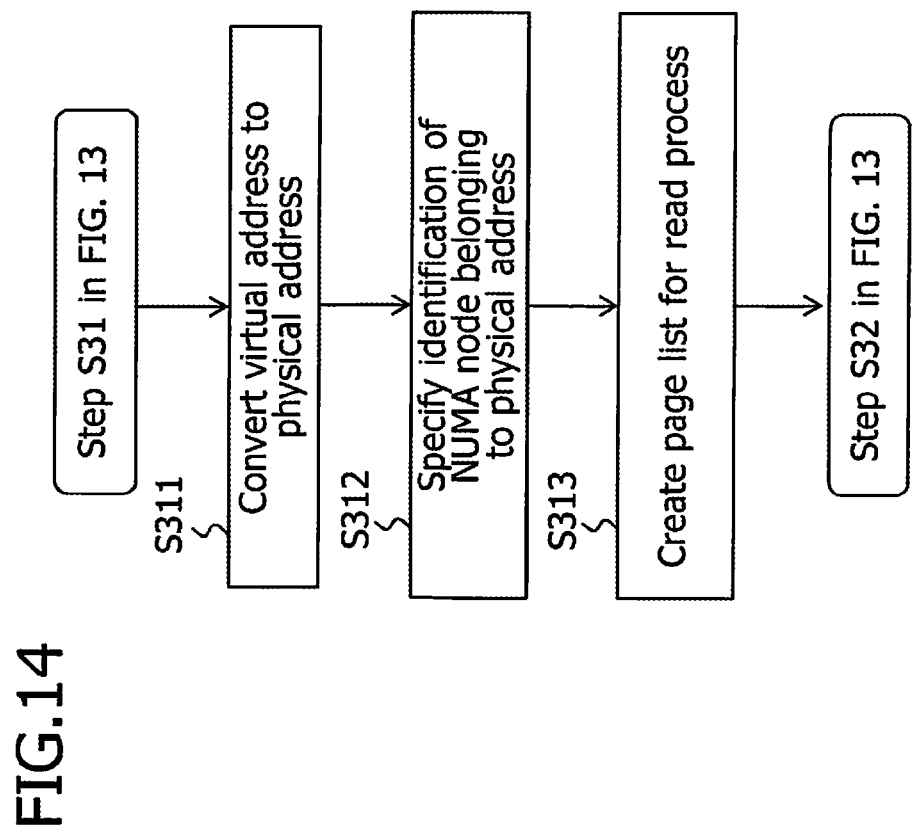
FIG. 14 is a flow diagram to explain the creation of the page list for the read process in FIG. 13.
Figure 16:
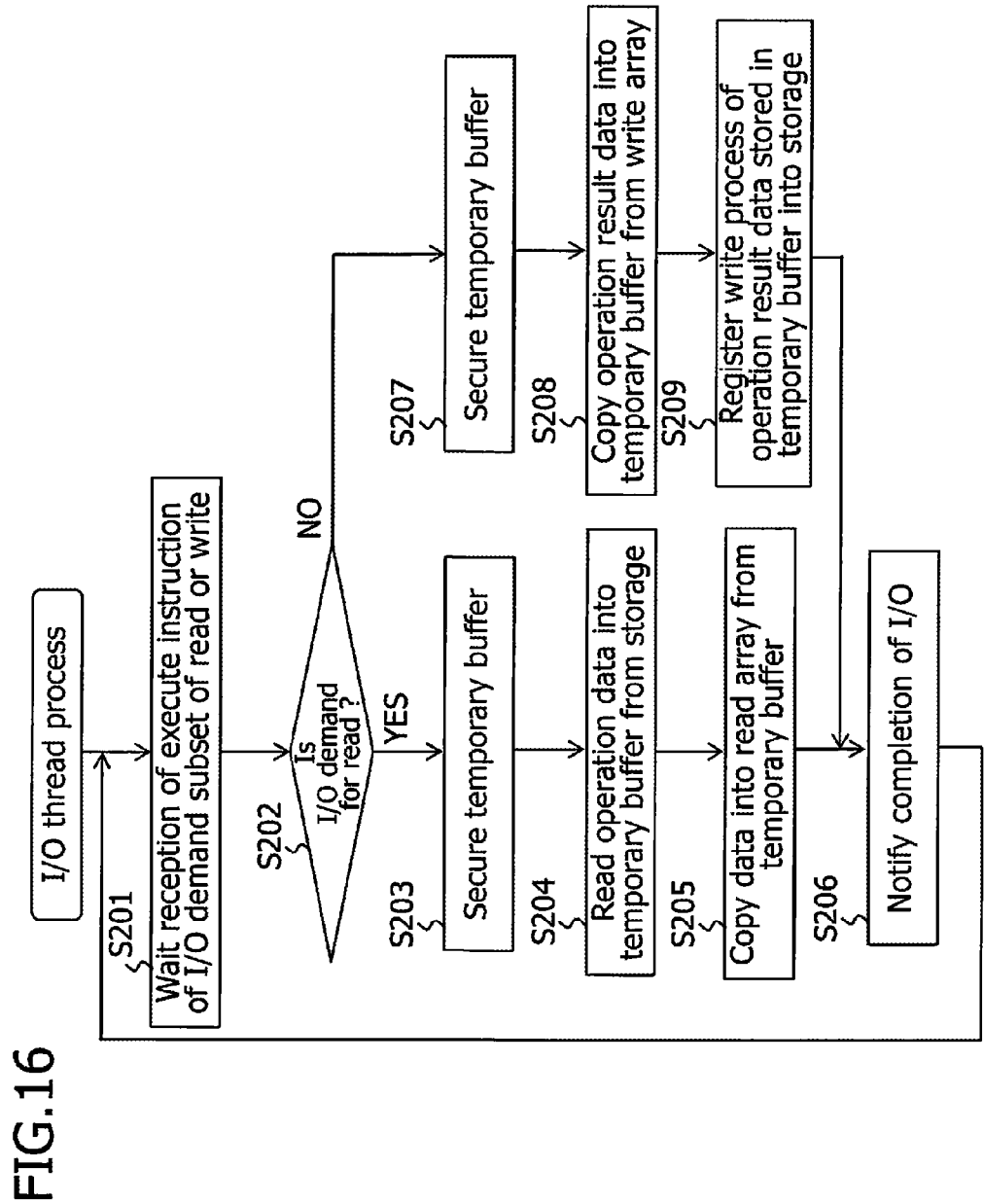
FIG. 16 is a flow diagram to explain read process in FIG. 13 and write process in FIG. 17.

FIG. 13-FIG. 16 are flow diagrams to explain read demand process in the step S3 of FIG. 10. FIG. 13 is a diagram to explain an outline of the read demand process in the step S3 in FIG. 10. FIG. 14 is a flow diagram to explain the creation of the page list for the read process in FIG. 13. FIG. 15A~FIG. 15D are diagrams explaining a page list for the read processing. FIG. 16 is a flow diagram to explain read process in FIG. 13 and write process in FIG. 17. Firstly, the flow diagram in FIG. 13 will be described.

(Acquisition of Page List)

Step S31 in FIG. 13: the parallel I/O processing part 22 receives a demand of the read processing from the first user thread 101, the parallel I/O processing part 22 instructs the creation of the page list for the read processing to the page list acquisition part 24. The page list acquisition part 24 creates a page list for the read processing in response to the instruction. The creation of page list for the read processing will be described with reference to FIG. 14, FIG. 15A~FIG. 15D.

(Creation of Page List for Read Processing)

Step S311 in FIG. 14: the page list acquisition part 24 converts the virtual addresses corresponding to the domain of the read array R1-R4, which are each secured in the first memory M1—the fourth memory M4, into physical addresses. In addition, the user thread and the I/O thread usually access a physical memory through the kernel by designating the address of the virtual memory. Therefore, the user thread and the I/O thread do not hold the information about the address of the physical memory. Therefore, conversion process in the step S311 is carried out in order that the user thread and the I/O thread hold the information of the address of the physical memory.

For this conversion, the page list acquisition part 24 acquires the page table which indicates correspond relation between the virtual address and the physical address from the kernel 30.

The page list acquisition part 24 converts the virtual addresses corresponding to the domain of the read array R1-R4, which are each secured in the first memory M1—the fourth memory M4, into physical addresses, based on the page table which is acquired.

(Identify the Identifier of NUMA Node)

Step S312: the page list acquisition part 24 identifies the identifier of the NUMA node that the memory (physical memory) including the memory area indicated by the physical address after the conversion, based on the correspondence information IN2 in FIG. 12. The identifier of the NUMA node corresponds to marks "ND1"-"ND4" indicating the NUMA node as described in FIG. 3.

It is described by a case that a physical address of the read array Rj (referring to FIG. 7A~FIG. 7D) which is secured in the j-th memory Mj (j is an integer of 1-4) is within the address ADR (j)-ADR (j+1) in FIG. 12. In this case, the page list acquisition part 24 identifies the identifier of the NUMA node, in which the memory including the memory area defined by this physical address belongs to, with "NDj" of the j-th NUMA node.

For example, it is described by a case that a physical address of the read array R1 which is secured in the first memory M1 is within the address ADR1-ADR2 in FIG. 12. In the case, the page list acquisition part 24 identifies the identifier of the NUMA node, in which the memory including the memory area defined by the physical address of the read array R1 belongs to, with "ND1" of the first NUMA node.

(Page List Creation)

Step S313: the page list acquisition part 24 creates a page list for the read processing.

The page list creation will be described with reference to FIG. 12, FIG. 15A~FIG. 15D. At first, the page list acquisition part 24 secures a domain for storing the page list in the domain of the first memory M1.

The page list acquisition part 24 creates the page list LSTrj for the read processing of the j-th NUMA node NDj which stores the address every page of read array Rj of the j-th memory Mj (j is an integer of 1-4), based on the correspondence information IN2 in FIG. 12.

For example, the page list acquisition part 24 creates the page list LSTr1 for the read process~the page list LSTr4 for the read process.

The page list LSTr1 for the read process stores the address of each page (PGr1-PGrp1) of the read array R1 in the first memory M1 belonging to the first NUMA node ND1. The page list LSTr2 for the read process stores the address of each page (PGr2-PGrp2) of the read array R2 in the second memory M2 to belong to the second NUMA node ND2.

The page list LSTr3 for the read process stores the address of each page (PGr3-PGrp3) of the read array R3 in the third memory M3 to belong to the third NUMA node ND3. The page list LSTr4 for the read process stores the address of each page (PGr4-PGrp4) of the read array R4 in the fourth memory M4 belonging to the fourth NUMA node ND4. Here, the "p1"-"p4" is integers more than 2.

In addition, the page list acquisition part 24 memorizes the page list for the read processing which is created in the secured domain for storing the page list. When the creation of the page list is finished, the process moves to the step S32 in FIG. 13.

(Division and Allocation of Page List)

Step S32 of FIG. 13: the parallel I/O processing part 22 divides (also call partitions) the page lists LSTr1-LSTr4 for the read processing. And the parallel I/O processing part 22 allocates a page list for the read processing, which is divided, into each I/O thread as an I/O demand subset of read. In addition, the page list acquisition part 24 may carry out the process of the step S32.

At first, this partition will be described with reference to FIG. 15A~FIG. 15D. Here, the j-th NUMA node NDj (j is an integer of 1-4) carries out two user threads. For example, the first NUMA node ND1 carries out the first user thread 101 and the second user thread 102. Therefore, the parallel I/O processing part 22 divides single page list for read processing into two.

For example, the parallel I/O processing part 22 partitions the page list LSTr1 for the read processing of the first NUMA node ND1 into a first page list for the first user thread 101 and a second page list for the second user thread 102. This partition is illustrated in a dash line in FIG. 15. In addition, the parallel I/O processing part 22 partitions so that the total memory capacity of the plurality of pages in the divided page list becomes than the capacity of the operation data for the user thread.

The page list for the read process of the first user thread 101 stores the address of the page of first correspondence domain RS1 (referring to FIG. 7A) in the read array R1. And the page list for the read process of the second user thread 102 stores the address of the page of second correspondence domain RS2 (referring to FIG. 7A) in the read array R1.

In addition, the parallel I/O processing part 22 partitions the page list LSTr2 for the read process of the second NUMA node ND2 into a third page list for the read processing of the third user thread 103 and a fourth page list for the read processing of the fourth user thread 104.

The page list for the read process of the third user thread 103 stores the address of the page of third correspondence domain RS3 (referring to FIG. 7B) of read array R2. And the page list for the read process of the fourth user thread 104 stores the address of the page of fourth correspondence domain RS4 (referring to FIG. 7B) of read array R2.

In addition, the parallel I/O processing part 22 divides the page list LSTr3 for the read process of the third NUMA node ND3 into a fifth page list for the read processing of the fifth user thread 105 and a sixth page list for the read processing of the sixth user thread 106.

The page list for the read process of the fifth user thread 105 stores the address of the page of the fifth correspondence domain RS5 (referring to FIG. 7C) of read array R3. And the page list for the read process of the sixth user thread 106 stores the address of the page of the sixth correspondence domain RS6 (referring to FIG. 7C) of the read array R3.

In addition, the parallel I/O processing part 22 divides the page list LSTr4 for the read process of fourth NUMA node ND4 into a seventh page list for the read processing of the seventh user thread 107 and a eighth page list for the read processing of the eighth user thread 108.

The page list for the read process of the seventh user thread 107 stores the address of the page of the seventh correspondence domain RS7 (referring to FIG. 7D) of the read array R4. And the page list for the read process of the eighth user thread 108 stores the address of the page of the eighth correspondence domain RS8 (referring to FIG. 7D) of the read array R4.

Then, the parallel I/O processing part 22 allocates a page list for the read process of the k-th user thread 10$k$ to the k-th I/O thread 23$k$ which is a pair of the k-th user thread 10$k$.

The page list assigned to the k-th I/O thread 23$k$ stores the address of the domain (page) of the physical memory of which the k-th I/O thread 23$k$ accesses. Therefore, by this allocation, it is possible that the k-th I/O thread 23$k$ identifies the page of the local memory to access.

By the processes in the steps S31, S32 of FIG. 13, the page list acquisition part 24 identifies a position (position of the read array) to write the operation data in the memory of the node belonged to the k-th core Ck carrying out the k-th I/O thread 23$k$, based on the correspondence information IN. And page list acquisition part 24 creates a page list for the read processing which stored the address of the plurality of pages in the position to write the operation data.

And, as described in FIG. 16, the k-th I/O thread 23$k$ of the k-th core Ck belonging to each of the plurality of nodes writes the operation data which is read from the storage system STR, based on an identified address, into the memory in the node that the k-th core Ck belongs to. The operation data are an example of the target data which is carried out arithmetic process.

Step S33: the parallel I/O processing part 22 instructs the execution of the I/O demand subset of read, to each I/O threads. Specifically, the parallel I/O processing part 22 instructs the execution of the I/O demand subset of the read to the first I/O thread 231—the eighth I/O thread 238. In addition, the processing that the I/O thread which receives the execution instruction carries out will be described in FIG. 16.

Step S34: the parallel I/O processing part 22 waits for a notice of completion from each I/O threads which are instructed.

With reference to FIG. 16, the read processing that the I/O thread, which received the execution instruction of the I/O demand subset of read, carries out will be described.

When the k-th I/O thread 23$k$ (k is an integer of 1~8) received the execution instruction of the I/O demand subset of read (step S33 in FIG. 13), the k-th I/O thread 23$k$ carries out the processing in steps S201-S206.

(Reception of I/O Demand Subset)

Step S201: the state of the k-th I/O thread 23$k$ is to wait for the reception of the execution instructions of the I/O demand subset of the read or the write.

Step S202: the k-th I/O thread receives an I/O demand subset and determines whether the I/O demand subset which is received is the I/O demand subset of the read. When the I/O demand subset is not the I/O demand subset of read (S202/NO), the process moves to step S207. On the contrary, in the case of the I/O demand subset of read (S202/YES), the process moves to step S203.

(Domain Securing of Temporary Buffer)

Step S203: the k-th I/O thread 23$k$ secures the domain of the temporary buffer in the physical memory of the own thread.

For example, the first I/O thread 231 secures the temporary buffer TB1 (referring to FIG. 6) in the first memory M1 which is the physical memory of the own thread.

In addition, when the domain of the temporary buffer has been already secured, the k-th I/O thread 23$k$ does not carry out the process of the step S203.

Here, it is possible that each I/O threads secure the domain of the temporary buffer by various methods as well as on-demand. For example, each I/O threads may pool a part of cache page that oneself uses and may secure the domain of this cache page which are pooled partly as a domain of the temporary buffer. By such a security, it is possible to raise responsiveness of the domain security. In addition, for the pool of the cache page, it is possible to compensate the cache page by securing a specific cache page at a stage of the I/O thread initialization and returning the cache which became needless.

(Write of Data for the Operation)

Step S204: the k-th I/O thread 23$k$ (k is an integer of 1-8) reads the operation data of the k-th user thread 10$k$ which is a pair of the k-th I/O thread 23$k$ from the operation file FA in the storage system STR. And the k-th I/O thread 23$k$ writes the operation data which is read into the temporary buffer of the own thread. The temporary buffer of the own thread is a temporary buffer secured in the memory in the node that a core carrying out an own thread belongs to.

With reference to FIG. 6 and FIG. 8, the process in the step S204 will be described. The first I/O thread 231 reads the operation data within the range defined by the file pointer PTR1$a$-PTR2$a$ from the operation file FA in FIG. 8, based on the file pointer information IN in the operation file FA. And the first I/O thread 231 writes the operation data which is read into the temporary buffer TB1 of the first memory M1 (referring to the read process of FIG. 6). The second I/O thread 232—the eighth I/O thread 238 also read the operation data of the user thread of the pair from the operation file FA like the first I/O thread 231 and writes the operation data which is read into the temporary buffer of the own thread.

As described above, it is possible that the k-th I/O thread 23$k$ reads the operation data, which is a target of the arithmetic process of which the k-th user thread 10k carries out, from the operation file FA in FIG. 8, by the file pointer information IN.

(Copy Processing)

Step S205: the k-th I/O thread 23k copies the operation data, which is written in the temporary buffer of the own thread, to the read array of the own thread. With reference to FIG. 6-FIG. 8, FIG. 15A~FIG. 15D, the step S205 will be described.

The k-th I/O thread 23k copies the operation data of the temporary buffer of the own thread in the domain of address stored in the page list for the read process of the k-th user thread 10k which is a pair of the k-th I/O thread 23k.

For example, the first I/O thread 231 copies the operation data (referring to the copy in FIG. 6) for the first user thread 101, which is written in the temporary buffer TB1, in the first correspondence domain RS1 (referring to FIG. 7A) of the read array R1. Here, the first correspondence domain RS1 in the read array R1 is a domain defined by the address of the plurality of pages for the first user thread 101 in the page list LSTr1 for the read process in FIG. 15A. In addition, the operation data for the first user thread 101 which are written in the temporary buffer TB1 are the operation data stored in the domain which is defined by the file pointer PTR1a-PTR2a in the operation file FA which is represented by FIG. 8.

In addition, the second I/O thread 232 copies the operation data for the second user thread 102, which are written in the temporary buffer TB1, in the second correspondence domain RS2 (referring to FIG. 7A) of the read array R1. Here, the second correspondence domain RS2 in the read array R1 is a domain which is defined by the address of the plurality of pages for the second user thread 102 in the page list LSTr1 for the read process in FIG. 15A. In addition, the operation data for the second user thread 102 which are written in the temporary buffer TB1 are the operation data stored in the domain which are defined by the file pointer PTR2a-PTR3a in the operation file FA which is depicted by FIG. 8.

In addition, the third I/O thread 233 copies the operation data for the third user thread 103, which are written in the temporary buffer TB2, in the third correspondence domain RS3 (referring to FIG. 7B) of the read array R2. Here, the third correspondence domain RS3 in the read array R2 is a domain which is defined by the address of the plurality of pages for the third user thread 103 in the page list LSTr2 for the read process in FIG. 15B. In addition, the operation data for the third user thread 103 which are written in the temporary buffer TB2 are the operation data stored in the domain which are defined by the file pointer PTR3a-PTR4a in the operation file FA which is depicted by FIG. 8.

In addition, the fourth I/O thread 234 copies the operation data for the fourth user thread 104, which are written in the temporary buffer TB2, in the fourth correspondence domain RS4 (referring to FIG. 7B) of the read array R2. Here, the fourth correspondence domain RS4 in the read array R2 is a domain which is defined by the address of the plurality of pages for the fourth user thread 104 in the page list LSTr2 for the read process in FIG. 15B. In addition, the operation data for the fourth user thread 104 which are written in the temporary buffer TB2 are the operation data stored in the domain which are defined by the file pointer PTR4a-PTR5a in the operation file FA which is depicted by FIG. 8.

In addition, the fifth I/O thread 235 copies the operation data for the fifth user thread 105, which are written in the temporary buffer TB3, in the fifth correspondence domain RS5 (referring to FIG. 7C) of the read array R3. Here, the fifth correspondence domain RS5 in the read array R3 is a domain which is defined by the address of the plurality of pages for the fifth user thread 105 in the page list LSTr3 for the read process in FIG. 15C. In addition, the operation data for the fifth user thread 105 which are written in the temporary buffer TB3 are the operation data stored in the domain which are defined by the file pointer PTR5a-PTR6a in the operation file FA which is depicted by FIG. 8.

In addition, the sixth I/O thread 236 copies the operation data for the sixth user thread 106, which are written in the temporary buffer TB3, in the sixth correspondence domain RS6 (referring to FIG. 7C) of the read array R3. Here, the sixth correspondence domain RS6 in the read array R3 is a domain which is defined by the address of the plurality of pages for the sixth user thread 106 in the page list LSTr3 for the read process in FIG. 15C. In addition, the operation data for the sixth user thread 106 which are written in the temporary buffer TB3 are the operation data stored in the domain which are defined by the file pointer PTR6a-PTR7a in the operation file FA which is depicted by FIG. 8.

In addition, the seventh I/O thread 237 copies the operation data for the seventh user thread 107, which are written in the temporary buffer TB4, in the seventh correspondence domain RS7 (referring to FIG. 7D) of the read array R4. Here, the seventh correspondence domain RS7 in the read array R4 is a domain which is defined by the address of the plurality of pages for the seventh user thread 107 in the page list LSTr4 for the read process in FIG. 15D. In addition, the operation data for the seventh user thread 107 which are written in the temporary buffer TB4 are the operation data stored in the domain which are defined by the file pointer PTR7a-PTR8a in the operation file FA which is depicted by FIG. 8.

In addition, the eighth I/O thread 238 copies the operation data for the eighth user thread 108, which are written in the temporary buffer TB4, in the eighth correspondence domain RS8 (referring to FIG. 7D) of the read array R4. Here, the eighth correspondence domain RS8 in the read array R4 is a domain which is defined by the address of the plurality of pages for the eighth user thread 108 in the page list LSTr4 for the read process in FIG. 15D. In addition, the operation data for the eighth user thread 108 which are written in the temporary buffer TB4 are the operation data stored in the domain which are defined by the file pointer PTR8a-PTR9a in the operation file FA which is depicted by FIG. 8.

By a page list for the read processing, it is possible that the k-th I/O thread 23k in the k-th core Ck writes the data which are the target of the arithmetic process in which the k-th user thread 10k of the pair carries out, into the memory of the node that the k-th core Ck belongs to.

(Notice of Completion)

Step 206: When the k-th I/O thread 23k completes the copy in the step S205 or the registration in the step S209 described later, the k-th I/O thread 23k notifies a notice of I/O completion to the user thread which is an origin of the read. After the notice, the k-th I/O thread 23k moves to execution instruction wait state (S201). In addition, the step S207-S209 will be described after FIG. 18.

The parallel I/O processing part 22 waits for the I/O completion notice from all I/O threads (step S33 in FIG. 13) which are instructed the execution of the I/O demand subset of read (step S34 in FIG. 13). When the parallel I/O processing part 22 receives a notice of the I/O completion from all I/O threads, the parallel I/O processing part 22 returns to the step S4 of FIG. 10. When the parallel I/O processing part 22 returns to the step S4, the parallel I/O processing part 22 carries out the steps S4~S12 sequentially and instructs the execution of the write processing to the first I/O thread 231~the eighth I/O thread 238 in response to a demand of the write processing (S13).

[Write Processing]

Figure 17:
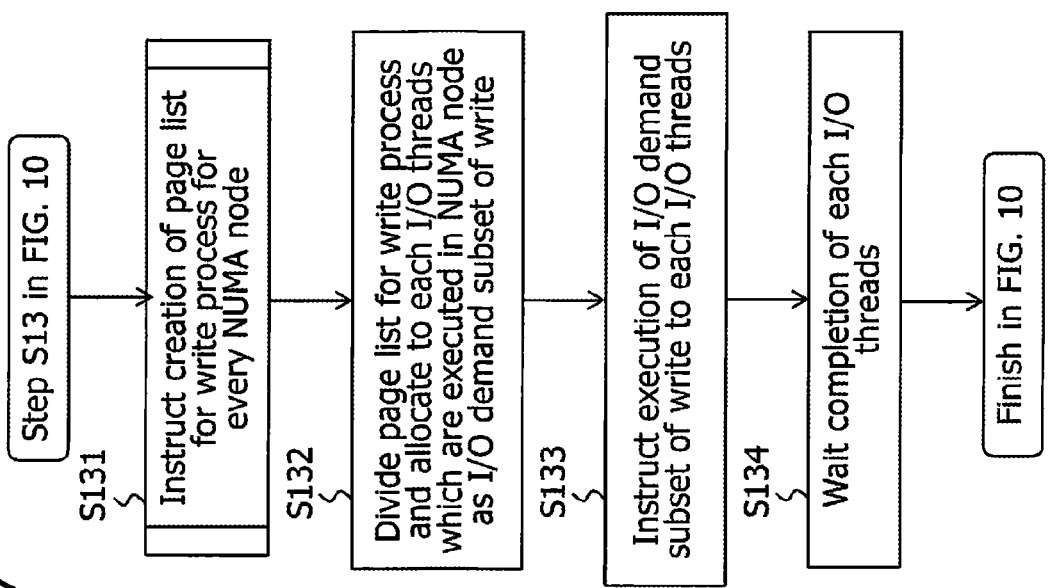
FIG. 17 is a flow diagram to explain an outline of the write demand process in the step S13 of FIG. 10.
Figure 18:
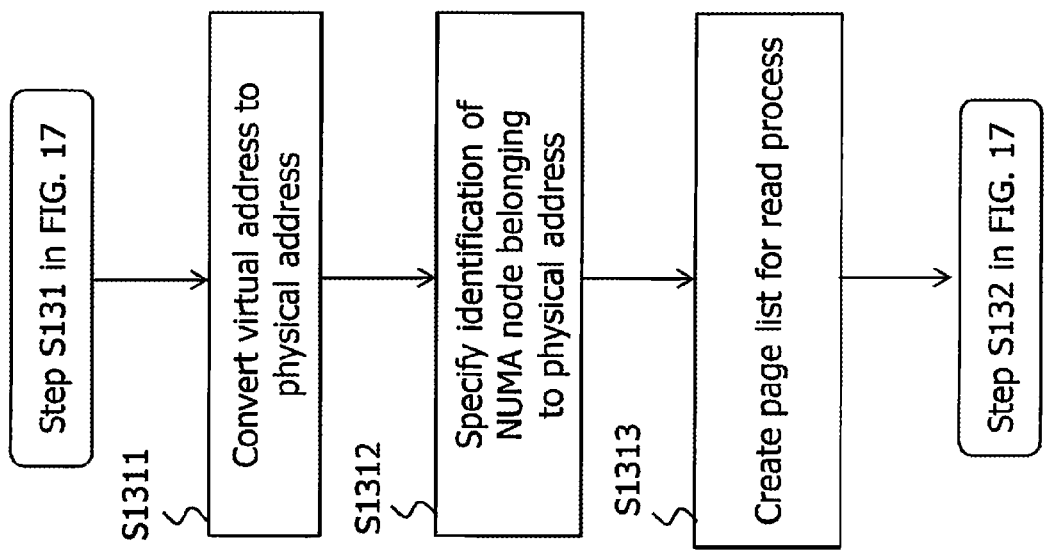
FIG. 18 is a flow diagram to explain the creation of the page list for the write process in FIG. 17.

FIG. 17 and FIG. 18 are flow diagrams to explain the write demand process in the step S13 of FIG. 10. FIG. 17 is a flow diagram to explain an outline of the write demand process in the step S13 of FIG. 10. FIG. 18 is a flow diagram to explain the creation of the page list for the write process in FIG. 17. FIG. 19 is a diagram explaining a page list for the write processing.

(Acquisition of Page List)

Step S131: when the parallel I/O processing part 22 receives a demand of the write processing from the first user thread 101, the parallel I/O processing part 22 instructs the creation of the page list for the write processing to the page list acquisition part 24. The page lists acquisition part 24 creates the page list for the write processing in response to the instruction. With reference to FIG. 18, FIG. 19, the creation process of the page lists for the write processing will be described.

(Creation of Page List for the Write Processing)

S1311 in FIG. 18: the page list acquisition part 24 converts the virtual address, which corresponds to the domain of the array W1-W4 for the write which are secured in the first memory M1~the fourth memory M4, into a physical address. This reason of converting is the same as the reason which is explained in the step S311 of FIG. 14.

For this conversion, the page list acquisition part 24 acquires the page table which indicates to a correspondence relation between the virtual address and the physical address from the kernel 30.

The page list acquisition part 24 converts the virtual address of the array W1-W4 for the write which are secured in the first memory M1~the fourth memory M4, into a physical address, based on the page table which is acquired.

(Identification of Identifier of NUMA Node)

Step S1312: the page list acquisition part 24 identifies the identifier of the NUMA node, in which the memory (physical memory) including the memory area designated by the physical address after the conversion belongs to, based on the correspondence information IN2 of FIG. 12. The identifier of the NUMA node corresponds to marks "ND1"-"ND4" indicating the NUMA node which is illustrated by FIG. 3.

It is studied that the physical address of the array Wj for the write (referring to FIG. 7A~FIG. 7D) which are secured in the j-th memory Mj (j is an integer of 1-4) are within the addresses ADR (j)-ADR (j+1) of FIG. 12. In this case, the page list acquisition part 24 identifies the identifier of the NUMA node, in which the memory including the memory area defined by this physical address belongs to, with "NDj" of the j-th NUMA node.

For example, the physical address of array W1 for the write which is secured in the first memory M1 is within the address ADR1-ADR2 of FIG. 12. In the case, the page lists acquisition part 24 identifies the identifier of the NUMA node, in which the memory including the memory area defined by the physical address of the array W1 for the write belongs to, with "ND1" of the first NUMA node.

(Page Lists Creation)

Step S1313: the page list acquisition part 24 creates a page list for the write processing.

With reference to FIG. 12 and FIG. 19, the creation of the page list will be described. At first, the page list acquisition part 24 secures a domain for storing the page list in the domain of the first memory M1.

The page list acquisition part 24, creates the page list LSTwj for the write process of the j-th NUMA node NDj (j is an integer of 1-4), based on the correspondence information IN2 in FIG. 12. The page list LSTwj for the write process of the j-th NUMA node NDj is a list which stores the address for every page of array Wj for the write in the j-th memory Mj belonging to the j-th NUMA node NDj.

The page list acquisition part 24 creates the first page list LSTw1 for the write process~the fourth page list LSTw4 for the write process.

The page list LSTw1 for the write processing stores the address of each page (PGw1-PGwp1) in the array W1 for the write in the first memory M1 belonging to first NUMA node ND1. The page list LSTw2 for the write processing stores the address of each page (PGw2-PGwp2) in the array W2 for the write in the second memory M2 belonging to the second NUMA node ND2.

The page list LSTw3 for the write processing stores the address of each page (PGw3-PGwp3) in the array W3 for the write in the third memory M3 belonging to the third NUMA node ND3. The page list LSTw4 for the write processing stores the address of each page (PGw4-PGwp4) in the array W4 for the write in the fourth memory M4 belonging to the fourth NUMA node ND4. Here, sign "p1"-"p4" is integers more than 2.

In addition, the page list acquisition part 24 memorizes the page list for the write processing which is created in the secured domain for storing the page list. When the creation of the page lists is finished, the process moves to the step S132 of FIG. 17.

(Division and Allocation of Page List)

Step S132 in FIG. 17: the parallel I/O processing part 22 divides (also called as partition) the page lists LSTw1-LSTw4 for the write processing separately. And the parallel I/O processing part 22 allocates the page list for the write processing which are divided into each I/O threads as an I/O demand subset of write. In addition, the page lists acquisition part 24 may carry out the process of the step S132.

At first, this partition will be described with reference to FIG. 19A~FIG. 19D. Here, the j-th NUMA node NDj (j is an integer of 1-4) carries out two user threads. For example, the first NUMA node ND1 carries out the first user thread 101 and the second user thread 102. Therefore, the parallel I/O processing part 22 divides the page list for single write processing into two.

For example, the parallel I/O processing part 22 divides the page list LSTw1 for the write process of the first NUMA node ND1 into a first page list for the write processing of the first user thread 101 and a second page list for the write processing of second user thread 102. This partition is illustrated in a dash line of FIG. 19A~FIG. 19D. In addition, the parallel I/O processing part 22 divides so that the total memory capacity of the plurality of pages in the divided page list becomes than the capacity of the operation result data of the user thread.

The page list for the write process of the first user thread 101 stores the address of the page of the first correspondence domain WS1 (referring to FIG. 7A) of the write array W1. And the page list for the write process of the second user thread 102 stores the address of the page of the second correspondence domain WS2 (referring to FIG. 7A) of the write array W1.

In addition, the parallel I/O processing part 22 divides the page list LSTw2 for the write process of the second NUMA node ND2 into a third page list for the write processing of the third user thread 103 and a fourth page list for the write processing of the fourth user thread 104.

The page list for the write process of the third user thread 103 stores the address of the page of the third correspondence domain WS3 (referring to FIG. 7B) of the write array W2. And the page list for the write process of the fourth user thread 104 stores the address of the page of the fourth correspondence domain WS4 (referring to FIG. 7B) of the write array W2.

In addition, the parallel I/O processing part 22 divides the page list LSTw3 for the write process of the third NUMA node ND3 into a fifth page list for the write processing of the fifth user thread 105 and a sixth page list for the write processing of the sixth user thread 106.

The page list for the write process of the fifth user thread 105 stores the address of the page of the fifth correspondence domain WS5 (referring to FIG. 7C) of the write array W3. And the page list for the write process of the sixth user thread 106 stores the address of the page of the sixth correspondence domain WS6 (referring to FIG. 7C) of the write array W3.

In addition, the parallel I/O processing part 22 divides the page list LSTw4 for the write process of the fourth NUMA node ND4 into a seventh page list for the write processing of the seventh user thread 107 and a eighth page list for the write processing of the eighth user thread 108.

The page list for the write process of the seventh user thread 107 stores the address of the page of the seventh correspondence domain WS7 (referring to FIG. 7D) of the write array W4. And the page list for the write process of the eighth user thread 108 stores the address of the page of the eighth correspondence domain WS8 (referring to FIG. 7D) of the write array W4.

Then, the parallel I/O processing part 22 assigns the page lists for the write process of the k-th user thread 10k to the k-th I/O thread 23k which is a pair of the k-th user thread 10k. The page list assigned to the k-th I/O thread 23k stores the address of the domain (page) of the physical memory accessed by the k-th I/O thread 23k. Therefore, by this allocation, it is possible that the k-th I/O thread 23k identifies the page of the local memory to access.

By the processes in the steps S131 and S132 of FIG. 17, the page list acquisition part 24 identifies a domain (domain of the write array) to write the operation result data in the memory of the node, in which the k-th core Ck carrying out the k-th I/O thread 23k belongs to, based on the correspondence information IN. And the page list acquisition part 24 creates the page list for the write processing which stored the addresses of the plurality of pages in the domain to write the operation result data.

And, as described in FIG. 16, the k-th I/O thread 23k in the k-th core Ck belonging to each of the plurality of nodes reads the operation result data based on an identified address.

Step S133: the parallel I/O processing part 22 instructs the execution of the I/O demand subset of write to each I/O threads. Specifically, the parallel I/O processing part 22 instructs the execution of the I/O demand subset of the write to the first I/O thread 231—the eighth I/O thread 238. In addition, the processing of which the I/O thread which received the execution instruction carries out will be described in FIG. 16.

Step S134: the parallel I/O processing part 22 waits for a completion notice of the execution from each I/O threads which are instructed.

With reference to FIG. 16, the write processing, of which the I/O thread which received the execution instruction of the I/O demand subset of writes carries out, will be described.

The k-th I/O thread 23k (k is an integer of 1-8), which received the execution instructions (step S133 of FIG. 17) of the I/O demand subset of writes, carries out the processes of the steps S201, S202, S207-S209, S206. In addition, the explanations of the steps S201, S202 are omitted because already explained.

(Reception of I/O Demand Subset)

The k-th I/O thread 23k receives the I/O demand subset and determines whether the I/O demand subset which is received is the I/O demand subset of the read (S202). When the I/O demand subset is not the I/O demand subset of read, in other words, in the case of the I/O demand subset of write (NO/S202), the process moves to the step S207.

(Domain Securing of Temporary Buffer)

Step S207: the k-th I/O thread 23k secures the domain of the temporary buffer in the physical memory of the own thread.

For example, the first I/O thread 231 secures the temporary buffer TB1 (referring to FIG. 6) in the first memory M1 which is the physical memory of the own thread.

In addition, the k-th I/O thread 23k does not carry out the process of the step S203 when the domain of the temporary buffer has been already secured.

(Copy)

Step S208: the k-th I/O thread 23k (k is an integer of 1-8) copies the operation result data, which is written in the k-th correspondence domain WSk of the write array of the own thread, in the temporary buffer of the own thread, based on a page list for the write process which is assigned.

For example, the first I/O thread 231 copies the operation result data, which is written in the first correspondence domain WS1 (cf. FIG. 7) of the write array W1 of the own thread, in the temporary buffer TB1 of the own thread. In addition, the first correspondence domain WS1 of the write array W1 is a domain defined by the address of the plurality of pages for the first user thread 101 in the page list LSTw1 for the write processing of FIG. 19A.

In addition, the second I/O thread 232 copies the operation result data, which is written in the second correspondence domain WS2 (referring to FIG. 7A) of the write array W1 of the own thread, in the temporary buffer TB1 of the own thread.

The third I/O thread 233~the eighth I/O thread 238 also perform the copy which is similar to the first I/O thread 231 and the second I/O thread 232.

(Registration)

Step S209: the k-th I/O thread 23k registers, for example, the process, which writes the operation result data, which is copied by the temporary buffer of own thread, in the storage system STR, with a cue. Because the processing, which writes the data memorized in the buffer in a file by an I/O thread, is carried out with an asynchronous, the process of the step S209 also is performed. In addition, the k-th I/O thread 23k notifies a notice of I/O completion to the user thread which is an origin of read after the execution of the step S209.

When the k-th I/O thread 23k reaches at the write timing of the operation result data, the k-th I/O thread 23k carries out the following write processing.

The k-th I/O thread 23k reads the operation result data of the k-th user thread 10k which is a pair of the k-th I/O thread 23k, which is copied in the temporary buffer of the own thread. And the k-th I/O thread 23k writes the operation result data which is read into the domain of storage system STR which is designated by the file pointer PTR(k)b-PTR (k+1)b in the operation result file FB depicted by FIG. 9. With reference to FIG. 6 and FIG. 19, this writing will be described.

The first I/O thread 231 writes the operation result data of the first user thread 101 which is stored in the temporary buffer TB1 into the domain of the storage system STR which is designated by the file pointer PTR1b-PTR2b in the operation result file FB depicted by FIG. 9. About this writing, the write process of FIG. 6 is referred.

In addition, the second I/O thread 232 writes the operation result data of the second user thread 102 which is stored in the temporary buffer TB1 into the domain of the storage system STR which is designated by the file pointer PTR2b-PTR3b in the operation result file FB depicted by FIG. 9.

The third I/O thread 233~the eighth I/O thread 238 executes the write process which is similar to the first I/O thread 231 and the second I/O thread 232, too.

Afterward, the login node 2 reads the operation result file FB which stores an operation result, and transmits it to the first operation terminal device 31. The first operation terminal device 31 outputs contents in the operation result file FB to a display unit.

Other Embodiment

In the step S1 of FIG. 10, the parallel I/O processing initialization part 21 receives the instruction from the user application 10, and creates the k-th I/O thread 23k (k is an integer of 1-8) and carries out it by the k-th core Ck.

Besides, when the parallel I/O processing initialization part 21 is developed in the memory and is shifted to an operation condition, the parallel I/O processing initialization part 21 may create the k-th I/O thread 23k (k is an integer of 1-8) and carries out it by the k-th core Ck.

In addition, in the timing when the first user thread 101 required the read processing for the parallel I/O processing part 22, the parallel I/O processing initialization part 21 may create the k-th I/O thread 23k (k is an integer of 1-8) and carries out it by the k-th core Ck.

In the array security (step S2) of FIG. 10, the first user thread 101 may carry out security of the above array using a library function for the exclusive NUMA operation that kernel 30 provides. In this security, the first user thread 101 sets placement of the memory for every read array and for every write array finely so that data accessed by each thread are located in the near memory of the core in which each threads work, in consideration of NUMA optimization.

The first user thread 101 uses the memory placement designation function that the kernel 30 provides in this setting.

In this setting, the first user thread 101 assigns not only the allocation of the virtual memory (virtual domain), but also assigns the allocation of the physical memory by assigning the allocation of the physics memory. The reasons of this allocation are as follows. That is, this is for avoiding the operation (called as a demand paging) which assigns the physics memory to at the time of the memory access in the operating, because the unevenness (also called as blurring) of the processing in each threads causes for the delay of the whole synchronous by the parallel information processing program.

In addition, it is possible to use various kernels offered generally as the kernel.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising a plurality of nodes, each nodes comprising:
   a main memory which stores data; and
   an arithmetic operation device configured to read a target data of which the arithmetic operation device executes an arithmetic operation from a storage device except the main memory and write the target data into the main memory of own node, and execute the arithmetic operation of the target data in the main memory, wherein the read the target data is based on a first address information indicating a storage position in the storage device,
   wherein the arithmetic operation device in one node in the plurality of nodes creates an I/O (Input/Output) processing thread that transfers the target data that the arithmetic operation device of each of the plurality of nodes shares the arithmetic operation in a parallel arithmetic processing, from the storage device to the main memory of the each of the plurality of nodes, to the arithmetic operation device in each of the plurality of nodes in response to an instruction of the parallel arithmetic processing,
   and wherein the arithmetic operation device in each of the plurality of nodes performs the I/O processing thread to transfer the target data for the parallel arithmetic processing, from the storage device to the main memory of own node.

2. The information processing device according to claim 1, wherein the arithmetic operation device is configured to write the target data into the main memory of own node, based on a second address information indicating a domain of the main memory belonging to each of the plurality of nodes and being set in the storage device.

3. The information processing device according to claim 1, wherein the arithmetic operation device is configured to write a result data of the arithmetic process into a domain designated by the second address information in the main memory of the own node, and to write the result data which is written in the main memory of the own node into the storage device.

4. The information processing device according to claim 3, wherein the arithmetic operation device is configured to read the result data which is written in the domain designated by the second address information in the main memory of the own node and write the result data which is read into the storage device, wherein the write the result data is based on a third address information indicating a storage position in the storage device and being set for each of the plurality of nodes.

5. A method of controlling an information processing device comprising a plurality of nodes, each nodes comprising an arithmetic operation device configured to execute an arithmetic process, and a main memory which stores data, the method comprising:
   creating, by the arithmetic operation device in one node in the plurality of nodes, an I/O (Input/Output) processing thread that transfers target data that the arithmetic operation device of each of the plurality of nodes shares the arithmetic operation in a parallel arithmetic processing, from the storage device to the main memory of the each of the plurality of nodes, to the arithmetic operation device in each of the plurality of nodes in response to an instruction of the parallel arithmetic processing;

performing, by the arithmetic operation device in each of the plurality of nodes, the I/O processing thread to transfer the target data for the parallel arithmetic processing, from the storage device to the main memory of own node; and executing, by the arithmetic operation device in each of the plurality of nodes, the parallel arithmetic process using the target data which is written into the main memory of own node.

6. A non-transitory computer readable storage medium storing therein a program for causing an information processing device comprising a plurality of nodes, each nodes comprising an arithmetic operation device configured to execute an arithmetic processing, and a main memory which stores data to execute a process, the process comprising:

creating, by the arithmetic operation device in one node in the plurality of nodes, an I/O (Input/Output) processing thread that transfers target data that the arithmetic operation device of each of the plurality of nodes shares the arithmetic operation in a parallel arithmetic processing, from the storage device to the main memory of the each of the plurality of nodes, to the arithmetic operation device in each of the plurality of nodes in response to an instruction of the parallel arithmetic processing;

performing, by the arithmetic operation device in each of the plurality of nodes, the I/O processing thread to transfer the target data for the parallel arithmetic processing, from the storage device to the main memory of own node; and executing, by the arithmetic operation device in each of the plurality of nodes, the parallel arithmetic process using the target data which is written into the main memory of own node.

7. The information processing device according to claim 1, wherein the arithmetic operation device of the one node that is created an user thread creates the user thread for the parallel arithmetic operation to the other nodes of the plurality of nodes and each of the arithmetic operation device in the plurality of nodes executes the user thread for the parallel arithmetic operation of the target data that is shared.

8. The method according to claim 5, wherein the executing comprises:

creating, by the arithmetic operation device of the one node that is created an user thread, the user thread for the parallel arithmetic operation to the other nodes of the plurality of nodes; and executing, by each of the arithmetic operation device in the plurality of nodes, the user thread for the parallel arithmetic operation of the target data that is shared.

9. The storage medium according to claim 6, wherein the executing comprises:

creating, by the arithmetic operation device of the one node that is created an user thread, the user thread for the parallel arithmetic operation to the other nodes of the plurality of nodes; and executing, by each of the arithmetic operation device in the plurality of nodes, the user thread for the parallel arithmetic operation of the target data that is shared.

* * * * *